United States Patent
Badawiyeh

(10) Patent No.: US 10,129,593 B2
(45) Date of Patent: Nov. 13, 2018

(54) TIME-BASED DYNAMIC SECONDARY CONTENT PLACEMENT CALLS IN TIME-SHIFTED CONTENT

(71) Applicant: CHARTER COMMUNICATIONS OPERATING, LLC, St. Louis, MO (US)

(72) Inventor: Basil Badawiyeh, Parker, CO (US)

(73) Assignee: Charter Communications Operating, LLC, St. Louis, MI (US)

( * ) Notice: Subject to any disclaimer, the term of this patent is extended or adjusted under 35 U.S.C. 154(b) by 0 days.

(21) Appl. No.: 15/458,868

(22) Filed: Mar. 14, 2017

(65) Prior Publication Data

US 2018/0270534 A1  Sep. 20, 2018

(51) Int. Cl.
   *H04N 21/458* (2011.01)
   *H04N 21/433* (2011.01)
   (Continued)

(52) U.S. Cl.
   CPC ..... *H04N 21/458* (2013.01); *H04N 21/23424* (2013.01); *H04N 21/4147* (2013.01);
   (Continued)

(58) Field of Classification Search
   CPC ............. H04N 21/458; H04N 21/4334; H04N 21/4147; H04N 21/23424; H04N 21/812; H04N 21/437
   See application file for complete search history.

(56) References Cited

U.S. PATENT DOCUMENTS 5,233,423 A   8/1993  Jernigan et al.
5,361,091 A   11/1994 Hoarty et al.
(Continued)

FOREIGN PATENT DOCUMENTS

WO   WO-0176236 A1   10/2001
WO   WO-0219581 A1   3/2002

OTHER PUBLICATIONS

CableLabsel Asset Distribution Interface (ADI) Specification, Version 1 1, MD-SP-ADI1.103-040107, Jan. 7, 2004. pp. 1-26.
(Continued)

*Primary Examiner* — Hoang Vu A Nguyen Ba
(74) *Attorney, Agent, or Firm* — Gazdzinski & Associates, PC

(57) ABSTRACT

Apparatus and methods for enabling time-based secondary content scheduling and dynamic placement for users of a content distribution network. In one embodiment, the network comprises a managed network, and the secondary content comprises advertising which was scheduled at the time the primary content was stored/recorded. A management process is adapted to identify the originally scheduled advertisements and utilize a temporal reference (e.g., time stamp) or other data associated with the original recording provided to the management process when an advertisement call is made dynamically, thereby preserving such relationship when the recorded content is requested for playback with a certain period of time, without having to store the advertisements with each recording. In another embodiment, a Campaign Management System (CMS) is used to associate campaigns based on a time period "in the past" (e.g., via use of one or more historic records regarding the advertisement placement for each user individually).

20 Claims, 20 Drawing Sheets

(51) Int. Cl.
  *H04N 21/4147* (2011.01)
  *H04N 21/234* (2011.01)
  *H04N 21/81* (2011.01)
  *H04N 21/437* (2011.01)

(52) U.S. Cl.
  CPC ....... *H04N 21/437* (2013.01); *H04N 21/4334* (2013.01); *H04N 21/812* (2013.01)

(56) References Cited

U.S. PATENT DOCUMENTS

| | | | |
|---|---|---|---|
| 5,774,170 | A | 6/1998 | Hite et al. |
| 6,446,261 | B1 | 9/2002 | Rosser |
| 6,487,721 | B1 | 11/2002 | Safadi |
| 6,718,551 | B1 | 4/2004 | Swix et al. |
| 7,017,174 | B1 | 3/2006 | Sheedy |
| 7,073,189 | B2 | 7/2006 | McElhatten et al. |
| 7,266,726 | B1 | 9/2007 | Ladd et al. |
| 7,457,520 | B2 | 11/2008 | Rosetti et al. |
| 7,555,006 | B2 | 6/2009 | Wolfe et al. |
| 7,602,820 | B2 | 10/2009 | Helms et al. |
| 7,763,360 | B2 | 7/2010 | Paul et al. |
| 7,908,626 | B2 | 3/2011 | Williamson et al. |
| 8,122,479 | B2 | 2/2012 | Britt |
| 8,280,982 | B2 | 10/2012 | La Joie et al. |
| 8,341,242 | B2 | 12/2012 | Dillon et al. |
| 8,392,952 | B2 | 3/2013 | Carlucci et al. |
| 8,561,116 | B2 | 10/2013 | Hasek |
| 8,813,124 | B2 * | 8/2014 | Tidwell ............ G06Q 30/02 725/34 |
| 8,997,136 | B2 | 3/2015 | Brooks et al. |
| 9,071,859 | B2 | 6/2015 | Lajoie |
| 9,178,634 | B2 | 11/2015 | Tidwell et al. |
| 9,277,266 | B2 | 3/2016 | Riedl et al. |
| 2002/0124249 | A1 | 9/2002 | Shintani et al. |
| 2002/0154885 | A1 | 10/2002 | Covell et al. |
| 2002/0164151 | A1 | 11/2002 | Jasinschi et al. |
| 2003/0056217 | A1 | 3/2003 | Brooks |
| 2003/0093790 | A1 | 5/2003 | Logan et al. |
| 2003/0208763 | A1 | 11/2003 | McElhatten et al. |
| 2003/0208783 | A1 | 11/2003 | Hillen et al. |
| 2004/0010807 | A1 | 1/2004 | Urdang et al. |
| 2004/0244058 | A1 | 12/2004 | Carlucci et al. |
| 2004/0255336 | A1 | 12/2004 | Logan et al. |
| 2005/0034171 | A1 | 2/2005 | Benya |
| 2005/0060742 | A1 | 3/2005 | Riedl et al. |
| 2005/0108768 | A1 | 5/2005 | Deshpande et al. |
| 2005/0152397 | A1 | 7/2005 | Bai et al. |
| 2006/0075449 | A1 | 4/2006 | Jagadeesan et al. |
| 2006/0130107 | A1 | 6/2006 | Gonder et al. |
| 2006/0130113 | A1 | 6/2006 | Carlucci et al. |
| 2007/0022459 | A1 | 1/2007 | Gaebel et al. |
| 2007/0033531 | A1 | 2/2007 | Marsh |
| 2007/0094691 | A1 | 4/2007 | Gazdzinski |
| 2007/0124416 | A1 | 5/2007 | Casey et al. |
| 2007/0217436 | A1 | 9/2007 | Markley et al. |
| 2008/0209464 | A1 | 8/2008 | Wright-Riley |
| 2008/0235746 | A1 | 9/2008 | Peters et al. |
| 2008/0276270 | A1 | 11/2008 | Kotaru et al. |
| 2009/0037960 | A1 | 2/2009 | Melby |
| 2009/0210899 | A1 | 8/2009 | Lawrence-Apfelbaum et al. |
| 2009/0217326 | A1 | 8/2009 | Hasek |
| 2009/0274212 | A1 | 11/2009 | Mizutani et al. |
| 2010/0251289 | A1 | 9/2010 | Agarwal et al. |
| 2011/0103374 | A1 | 5/2011 | Lajoie et al. |
| 2011/0264530 | A1 | 10/2011 | Santangelo et al. |
| 2012/0210382 | A1 | 8/2012 | Walker et al. |
| 2015/0271541 | A1 * | 9/2015 | Gonder ............... H04N 21/278 725/134 |
| 2015/0324379 | A1 | 11/2015 | Danovitz et al. |
| 2016/0307596 | A1 | 10/2016 | Hardin et al. |
| 2017/0353768 | A1 | 12/2017 | Muvavarirwa |

OTHER PUBLICATIONS

Deering et al., Internet Protocol, Version 6 (Ipv6) Specification, IETF RFC 2460 (Dec. 1998).
DOCSIS 1.0: Cable Modem to Customer Premise Equipment Interface Specification, dated Nov. 3, 2008, 64 pages.
DOCSIS 1.1: Operations Support System Interface Specification, dated Sep. 6, 2005, 242 pages.
DOCSIS 1.1: Radio Frequency Interface Specification, dated Sep. 6, 2005, 436 pages.
DOCSIS 2.0: Radio Frequency Interface Specification, dated Apr. 21, 2009, 499 pages.
DOCSIS 3.0: Cable Modem to CPE Interface Specification, dated May 9, 2017, 19 pages.
DOCSIS 3.0: MAC and Upper Layer Protocols Interface Specification, dated Jan. 10, 2017, 795 pages.
DOCSIS 3.0: Operations Support System Interface Specification, dated Jan. 10, 2017, 547 pages.
DOCSIS 3.0: Physical Layer Specification, dated Jan. 10, 2017, 184 pages.
DOCSIS 3.1: Cable Modem Operations Support System Interface Specification, dated May 9, 2017, 308 pages.
DOCSIS 3.1: CCAP Operations Support System Interface Specification, dated May 9, 2017, 703 pages.
DOCSIS 3.1: MAC and Upper Layer Protocols Interface Specification, dated May 9, 2017, 838 pages.
DOCSIS 3.1: Physical Layer Specification, dated May 9, 2017, 249 pages.
Internet Protocol DARPA Internet Program Protocol Specification, IETF RFC 791 (Sep. 1981).
SCTE 130-1 2008 Digital Program Insertion—Advertising Systems Interfaces standards.
SCTE 130-10 2013: Digital Program Insertion—Advertising Systems Interfaces Part 10—Stream Restriction Data Model.
SCTE 130-2 2008a: Digital Program Insertion—Advertising Systems Interfaces Part 2—Core Data Elements.
SCTE 130-2 2014 Digital Program Insertion—Advertising Systems Interfaces standards.
SCTE 130-3 2013: Digital Program Insertion—Advertising Systems Interfaces Part 3—Ad Management Service Interface.
SCTE 130-4 2009: Digital Program Insertion—Advertising Systems Interfaces Part 4—Content Information Service.
SCTE 130-5 2010: Digital Program Insertion—Advertising Systems Interfaces Part 5—Placement Opportunity Information Service.
SCTE 130-6 2010: Digital Program Insertion—Advertising Systems Interfaces Part 6—Subscriber Information Service.
SCTE 130-7 2009: Digital Program Insertion—Advertising Systems Interfaces Part 7—Message Transport.
SCTE 130-8 2010a: Digital Program Insertion Advertising Systems Interfaces Part 8—General Information Service.
SCTE 130-9 2014: Recommended Practices for SCTE 130 Digital Program Insertion—Advertising Systems Interfaces.
SCTE Standards Document ANSI/SCTE 130-1 2013 entitled "Digital Program Insertion—Advertising Systems Interfaces, Part 1—Advertising Systems Overview," 20 pages.
SCTE130-3 2010: Digital Program Insertion—Advertising Systems Interfaces Part 3—Ad Management Service Interface.

* cited by examiner

TIME-BASED DYNAMIC SECONDARY CONTENT PLACEMENT CALLS IN TIME-SHIFTED CONTENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content data delivery over a network. More particularly, the present disclosure is related in one exemplary aspect to apparatus and methods for secondary content (e.g., advertising, promotions, infomercials, etc.) management and provision within a managed content distribution network such as a cable, satellite, or hybrid fiber/copper (HFCu) distribution network.

2. Description of Related Technology

Digital video recorders (DVRs) and personal video recorders (PVRs) are devices which record video content, in digital format, to a disk drive or other medium. The use of such devices is now ubiquitous, and they provide conveniences to TV viewers such as e.g., (i) allowing a user to record a program for later review, (ii) allowing a user to record every episode of a program for a period, and/or (iii) automatically recording programs for the user based on viewing habits and preferences. Further, the presentation of the recorded programming content can be manipulated by exercising rewind, pause, play, stop, and fast-forward functions (hereinafter referred to as "trick mode" functions) in such DVRs and PVRs.

Similarly, nPVR/nDVR functionality provides a user with the ability to control delivery of the content similar to a VoD session, yet for broadcast or live programs ("linear" content). And unlike traditional DVR/PVR approaches, the subscriber need not maintain a recording device within their premises. The MSO or other entity in effect maintains the recorder for the subscriber at the headend or distribution node. Accordingly, "broadcast" or other scheduled internet content could be treated under an nPVR/nDVR paradigm, and recorded and replayed via a network-based device.

"Start-over" technology allows, among other things, a user to restart an in-progress program regardless of whether the user has previously elected to record the program locally. In other words, the "start-over" service obviates the need of a proactive effort otherwise required of a typical DVR user, which includes deciding and actively electing in advance what shows to record.

One type of content that can be recorded, whether locally or at the network, comprises linear or broadcast content to be delivered in real time; i.e., the re-multiplexed MPEG-2 (or other format) transport stream is delivered as part of the broadcast stream created at the headend or server hub.

The provision of "on-demand" (OD) services, such as e.g., video on-demand or VOD, is well known in the prior art. In a typical configuration, the VOD service makes available to its users a selection of multiple video programs that they can choose from and watch over a network connection with minimum setup delay. At a high level, a VOD system consists of one or more VOD servers that pass and/or store the relevant content; one or more network connections that are used for program selection and program delivery; and customer premises equipment (CPE) to receive, decode and present the video on a display unit. The content is typically distributed to the CPE over a Hybrid Fiber Coaxial (HFC), satellite, or Hybrid Fiber Copper (HFCu) network.

Alternatively, so-called "OTT" or "over-the-top" OD content is delivered via the aforementioned networks, but in effect only using the network as a carrier between a third-party server and the user's client device (e.g., IP-enabled tablet, Smart TV, smartphone, etc.). The provision of content is not managed or subscribed by the network operator. Internet or other "OTT" content may be broadcast or delivered on-demand, such as in response to an affirmative user selection via e.g., a PC, mobile device, or on-screen user interface. Such content stream is typically delivered to the subscriber and recorded locally, such as by a digital video recorder (DVR), the content being stored on a local repository (e.g., hard drive, SSD, or other mass storage device) associated therewith. Network-based DVRs can also be used for storage of OTT content, although this requires coordination/cooperation between the network operator (e.g., MSO) and the OTT content source.

Video Processing for Advertisement Insertion

In the context of such network services, it is often highly desirable to provide users or subscribers of the network with "secondary" content (such as e.g., advertisements, promotions or "info-mercials", related shorts, telescoping information/advertisements, hyperlinks, etc.). The secondary content may be directly or indirectly related to the "primary" content which the user selected in the first place (such as via a common theme or context, common persons of interest, common demographic factors, etc.), or can be totally unrelated thereto.

Delivery of secondary content may comprise a major source of revenue for commercial television or movie distributors, and for the network operator. For example, where the secondary content comprises advertisements, it may be a main source of income for national television broadcasters and their local over-the-air affiliates. Cable, satellite, HFCu, and other content distribution networks, as well as Internet content providers, also derive income from the sale of advertising time and insertion opportunities (and "impressions" associated therewith).

Using a typical VOD architecture for illustration, content is prepared for transmission and/or segmenting by processing through various staging processes. The segmenting processes include dividing the content video feed on valid GOP boundaries, or I-frames. Segmenting the video feed at the segmenting process results in content which is segmented based on a schedule. The segmented content is typically examined by a business management process (BMS). The management process, inter alia, creates a data file regarding the segmented content. The data file gives metadata regarding the content and "points" to the segmented portions of the content on the disk.

Once the management process has created a data file for the content, it is sent to a VOD server. The VOD server stores the content and is also receives a playlist of advertisements. The VOD server, therefore, will receive the segmented content as well as a file indicating where the various portions of the content are and in what order they should be arranged (i.e., according to the linear schedule); the VOD server also receives advertisements for insertion into the segmented content (or to replace one or more original advertisements associated with the primary content). Hence, secondary content insertion which targets the user, the device, and/or is related to the context of the primary content, is usually dynamically selected to be inserted into the segmented content, or to replace the original advertisements.

However, under one type of approach, dynamic advertisement insertion using targeted advertisements (or any other advertisements other than those originally scheduled) may only be performed after expiration of a prescribed period of time, and/or or after other conditions & restrictions have been met (e.g., expiry of three (3) days after an original broadcasting of a linear or VOD program). This restriction relates to certain rating-based paradigms, as well as potentially business rules and contractual agreements between the network operator (e.g., MSO) and content owners.

Specifically, so-called Nielsen Ratings (the primary measurement of a TV program's success in the U.S.) has designated a TV Ratings measurement window used in assessing program content to include the three (3) days beyond a given linear program's initial broadcast. Known as "C3", this window is in effect a standardized period during which the average audience viewing of a program can be measured. The ratings derived from such audience measurements are used to buy and sell advertising (slots). Subsequently, a seven (7) day window was introduced ("C7") by Nielsen, which increases the opportunity for, inter alia, subscription-based TV operators to monetize via advertising. Currently, measurements up to thirty-five (35) days from original broadcast or availability are used in conjunction with e.g., DVR-based and OTT (over-the top) on-demand viewing (hereinafter "C35").

However, the delivery of effective advertising for views of the linear content during and after C3/C7 presents a number of challenges. For example, programmers may wish to make linear programming immediately available after their "live" broadcast, such as via a VOD delivery model. To support the complete C3 (and C7, etc.) windows, the complete advertising inventory (load) & the content itself is retained and uploaded as a single asset into the network operator's content management system (CMS). After the C3/C7 window has expired, the viewership associated with the retained advertisements are no longer measured, and may no longer be relevant to users of the network.

One solution with respect to the replacement of the expired or "stale" advertisements is to archive the original uploaded asset, upload a new programming asset without any advertisements, and subsequently insert more "fresh" advertisements. The exemplary Comcast mpx system utilizes so-called dynamic advertisement insertion (DAI), which ostensibly allows a programmer or network operator to replace any "stale" advertisement in the original program without needing to replace the original as-aired linear programming asset as described above. During the C3/C7 window, the mpx system presents any advertisements as originally broadcast (including preventing users from skipping over those advertisements, such as via trick-mode functionality). Once the C3/C7 window has expired, the mpx system performs dynamic advertising insertion to replace the existing advertisements, including either (i) global removal of all existing advertisements, or (ii) selectively replacement of individual advertisements.

However, systems such as the mpx suffer from various disabilities, including the requirement that during the C3/C7 window, the existing advertisements and the primary (e.g., linear broadcast) content must both be stored as a single asset, and no DAI is permitted. So, for instance, where User X requests to store a linear broadcast at time t, the advertisements that would have been inserted at time t are also stored in association with the primary (linear) content, e.g., in-line (as a single content element). However, such an approach consumes excessive amounts of network storage space, especially where the different users requesting the recordation of their respective content are highly heterogeneous in nature (e.g., very different demographics & geographies, and/or very different requested content for recording). Systems such as mpx may be useful where there is no heterogeneity, since the storage burden is low (because the same advertisements are stored for all or a great percentage of users), but rapidly consume excessive resources the more individualized each recording, and its particular advertisements, become, so as to be untenable.

Additionally, segment-based advertisement recording and/or targeted advertisement placement may be limited during the C3 or C7 window (and hence the benefits associated with such DAI are lost). Moreover, DAI may not be available under other circumstances such as where an error occurs, or where DAI is not implemented with respect to post-C3/C7 content.

Based on the foregoing, there is a need for improved apparatus and methods for enabling preservation of secondary content state (e.g., to obey measurement-based rules on advertising substitution such as C3/C7/C35), and/or contractual obligations or business agreements regarding the selection and placement of secondary content. Such improved apparatus and methods would ideally, in one case, enable a network operator (via e.g., an automated management process) to e.g., later identify the original secondary content scheduled for insertion when the recording occurred, without the requirement to consume large amounts of network or other storage space for effectively duplicative copies of the same secondary content. Such later-identified secondary content could then be inserted within the recorded content at delivery or playback of the latter, thereby recreating and preserving the original state of the recorded content and its associated user- or client device-specific secondary content.

SUMMARY

The present disclosure addresses the foregoing needs by disclosing, inter alia, apparatus and methods for secondary content selection and insertion within a content distribution network infrastructure.

In one aspect of the disclosure, a computerized method of delivering content in a content distribution network is disclosed. In one embodiment, the method includes: receiving a request for storing programming content, the request being received through the content distribution network; storing the requested programming content; identifying one or more secondary content elements associated with the requested programming content at a time the storing is effected; receiving a request for at least a portion of the stored programming content from at least one of a plurality of client devices; determining that the request meets one or more prescribed criteria; and based on the determination that the request meets the one or more prescribed criteria, causing delivery of the identified one or more secondary content elements to the at least one of the plurality of client devices.

In one variant, the method further includes storing data indicating at least a time the storing of the programming content is effected, and the one or more prescribed criteria comprise a time associated with receipt of the request being within a prescribed temporal window of the time of the storing of the programming content. In another variant, the request is associated with a client device or user associated with a subscriber account of the network, and the identifying one or more secondary content elements associated with the requested programming content at a time the storing is effected comprises: (i) contacting a secondary content decision process using at least data indicative of the client device or user; and (ii) receiving from the secondary content decision process first data indicative of the one or more secondary content elements to be inserted into the stored programming content. Delivery of the identified one or more secondary content elements to the at least one of the plurality of client devices comprises causing delivery according to respective cues within the stored programming content while the stored programming content is being delivered to the at least one client device.

For example, in one implementation, the stored programming content comprises linear content, and the cues comprise SCTE-35 cues.

In another implementation, at least a portion of the stored programming content is stored on a network-based storage device and within a storage area designated for use by the user only. In one such approach, only a portion of a copyrighted content element (e.g., linear broadcast, VOD movie, etc.) is stored within a storage area designated for use by the user only, yet this portion is needed to properly decode and render the content element as a whole (when combined with the remainder of the content element, the latter which is stored in a non-user specific storage area of the network). In this fashion, the dual goals of (i) control of access to the copyrighted material to only a limited number or a single user; and (ii) network or "cloud" storage efficiencies from not having to individually store multiple complete copies for each user in their designated storage area, are achieved.

In another embodiment, the method includes: receiving a request for storing programming content initiated from the client device; based at least on the request, causing storage of the programming content; causing selection, at a time the storing is effected and based at least on data relating to the client device or user, of one or more secondary content elements to be inserted within the programming content; storing first data indicating the time the storing is effected and second data indicating the selected one or more secondary content elements; subsequently receiving a request for playback of at least a portion of the stored programming content initiated from the client device; determining that the request is received within a prescribed time period from the time indicated by the first data; and based on the determination that the request is received within the prescribed time period, causing delivery of the selected one or more secondary content elements to the client device at one or more insertion points specified within the programming content, the causing delivery based at least on the second data.

In another aspect of the disclosure, computer readable apparatus comprising a non-transitory storage medium is disclosed. In one embodiment, the non-transitory medium includes at least one computer program having a plurality of instructions, the instructions configured to, when executed on a processing apparatus of a server apparatus within a content distribution network: receive a request for storing programming content initiated from a client device; based at least on the request, cause storage of the programming content; store first data indicating the time the storage is effected; subsequently receive a request for playback of at least a portion of the stored programming content initiated from the client device; determine that the request is received within a prescribed time period measured from the time indicated by the first data; based on the determination that the request is received within the prescribed time period, cause selection, based at least on data relating to the client device or a user associated therewith, of one or more secondary content elements to be inserted within the programming content, the selection of the one or more secondary content elements based at least in part on the first data; and cause storage of second data indicating at least the selected one or more secondary content elements.

In one variant the selection of the one or more secondary content elements based at least in part on the first data comprises identification of one or more secondary content elements that would have been selected at the time indicated by the first data. In one implementation thereof, the identification of one or more secondary content elements that would have been selected at the time indicated by the first data comprises access of historical data indicating one or more advertising campaigns that were in effect at the time indicated by the first data.

In another implementation, the identification of one or more secondary content elements that would have been selected at the time indicated by the first data comprises access of data indicating one or more user contexts at the time indicated by the first data.

In a further aspect, computerized network apparatus configured for secondary content management within a content distribution network is disclosed. In one embodiment, the computerized network apparatus includes: processor apparatus; first network interface apparatus in data communication with the processor apparatus and configured to communicate with one or more network entities configured to select appropriate secondary content for respective ones of the plurality of user receiver devices; second network interface apparatus in data communication with the processor apparatus and configured to communicate with a network content storage apparatus; third network interface apparatus in data communication with the processor apparatus and configured to communicate with a plurality of user receiver devices via at least one or more communication channels of the content distribution network; and storage apparatus in data communication with the processor apparatus, the storage apparatus comprising at least one computer program.

In one variant, the at least one computer program is configured to, when executed on the processor apparatus: receive from one of the plurality of user receiver devices via the third interface, a request to record programming content; determine, via at least data communication with the one or more entities via the first interface, a transitory secondary content context associated with the requested programming content; store data relating to the determined transitory secondary content context; cause, via at least data communication with the network content storage apparatus via the second interface, recordation of the requested programming content; and associate the stored data relating to the determined transitory secondary content context to be associated with the recorded programming content such that upon access of the recorded programming content by the one user receiver device, the stored data relating to the determined secondary content context and associated with the recorded programming content is utilized in at least provision of one or more secondary content elements.

In one implementation, the determined transitory content context comprises a listing of secondary content elements temporally appropriate for a time when the request was received by the computerized network apparatus. In another variant, the listing of secondary content elements temporally appropriate for a time when the request was received by the computerized network apparatus further comprises one or more secondary content elements that are also contextually appropriate to a subject matter or theme associated with the programming content.

In a further variant, the determined transitory content context comprises data indicative of at least one of (i) one or more demographics associated with a user of the one receiver device; (ii) descriptive data associated with a subscriber account associated with the user.

In another aspect of the disclosure, a system for content recording is disclosed. In one embodiment, the system includes a network server process, and a corresponding client-side process for communication with the server process. In one variant, the server process is configured to receive client-initiated requests for recording of content (e.g., linear, VOD, or other), and obtain context-related data for the request. The system utilizes the context-related data to generate state information which can be stored either with the recorded content or at another data repository (including the client device), so as to enable recreation of the state/context of the recorded content for purposes of secondary content selection. In another aspect of the disclosure, a method for preserving advertising state associated with a recording, without having to consume significant network resources, is disclosed. In one embodiment, the method includes: determining an advertising context associated with a recording; based at least on the determined context, saving state data relating to the recording; and during subsequent playback of the recording, utilizing the saved state data to access the relevant secondary content which would have been selected at original delivery of the recorded content.

In a further aspect, a client device is disclosed. In one embodiment, the client device comprises application software configured to operate thereon, the application software obtaining context information regarding the client device and/or the user to be utilized in subsequent playback of recorded content so as enable selection and insertion of secondary content applicable or appropriate to the original context.

These and other aspects of the disclosure shall become apparent when considered in light of the detailed description provided herein.

BRIEF DESCRIPTION OF THE DRAWINGS

FIG. 3a-1 is a logical flow diagram illustrating another exemplary embodiment of a method for enabling time-based secondary content placement calling using a cloud-based storage system in accordance with the present disclosure.

FIG. 3a-2 is a logical flow diagram representing one embodiment of a method for evaluating the certain criteria, storing and accessing a content asset in accordance with the method of FIG. 3a-1.

FIG. 3a-3 is a logical flow diagram representing one embodiment of a method for virtual content compression processing in accordance with the method of FIG. 3a-1.

FIG. 3b-1 is a logical flow diagram illustrating another exemplary embodiment of a method for enabling time-based advertisement placement calling using associated campaigns in accordance with the present disclosure.

FIG. 3b-2 is a logical flow diagram representing one embodiment of a method for delivering content in accordance with the method of FIG. 3b-1.

Figure 1:
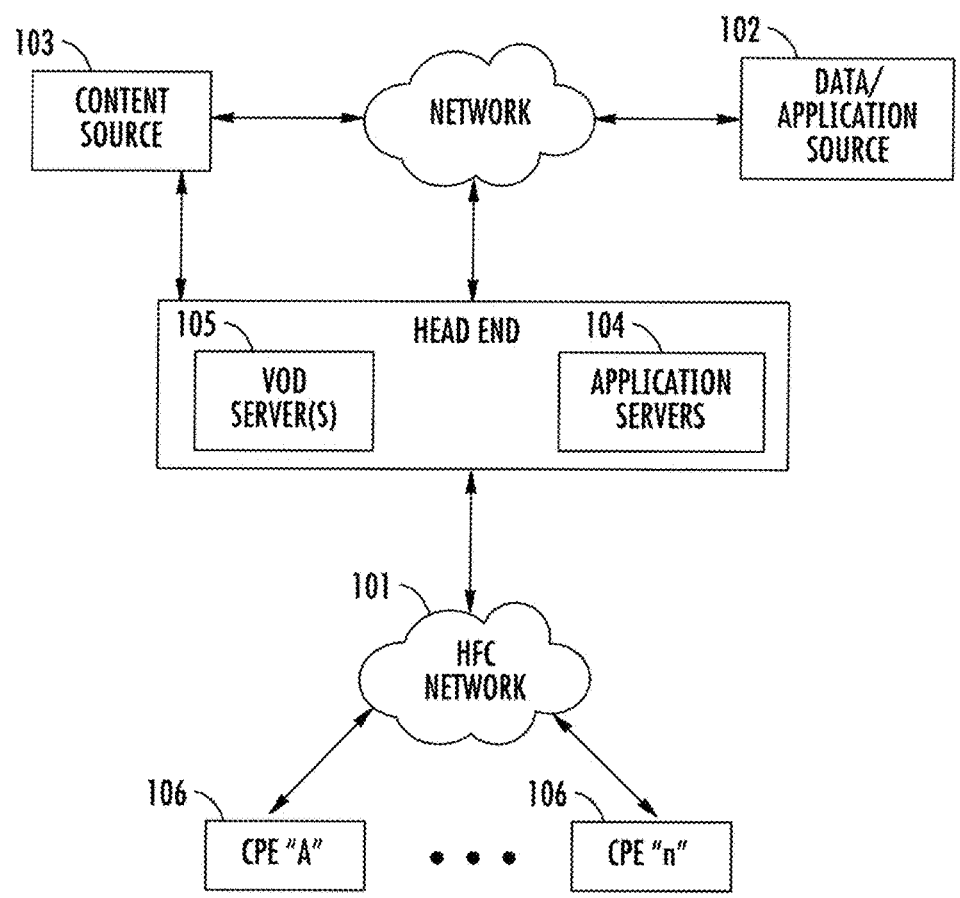
FIG. 1 is a functional block diagram illustrating an exemplary hybrid fiber/coax (HFC) cable network configuration useful with the present disclosure.

All figures © Copyright 2016-2017 Charter Communications, Inc. All rights reserved.

DETAILED DESCRIPTION

Reference is now made to the drawings wherein like numerals refer to like parts throughout.

As used herein, the term "advertising zone" may include the delivery of advertisements, promotions, or other secondary content with an actual geographic zone, a demographic "zone" or logical space, a psychographic zone or logical space, a user-based preference space, a primary/secondary content context space, and so forth. As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "client device" includes, but is not limited to, CPE such as digital set-top boxes (e.g., DSTBs), personal computers (PCs), and minicomputers, whether desktop, laptop, or otherwise, and mobile devices such as handheld computers, tablets, phablets, personal digital assistants (PDAs), personal media devices (PMDs), and smartphones.

As used herein, the term "computer program" or "software" is meant to include any sequence or human or machine cognizable steps which perform a function. Such program may be rendered in virtually any programming language or environment including, for example, Python, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), C#, and the like.

The terms "consumer premises equipment" (CPE) and "consumer device" refer without limitation to any type of electronic equipment for use within a consumer's or user's premises and connected to a content distribution network. The term "consumer device" includes terminal devices that have access to digital television content via a satellite, cable, or terrestrial network. The term "consumer premises equipment" (CPE) includes such electronic equipment such as set-top boxes (e.g., DSTBs or IPTV devices), televisions, cable modems (CMs), embedded multimedia terminal adapters (eMTAs), whether stand-alone or integrated with other devices, digital video recorders (DVR), gateway storage devices, and ITV personal computers.

As used herein, the term "database" refers generally to one or more tangible or virtual data storage locations, which may or may not be physically co-located with each other or other system components.

As used herein, the term "DOCSIS" refers to any of the existing or planned variants of the Data Over Cable Services Interface Specification, including for example DOCSIS versions 1.0, 1.1, 2.0, 3.0 and 3.1. DOCSIS (version 1.0) is a standard and protocol for internet access using a "digital" cable network.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose complex instruction set computing (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the term "network content provider" refers generally and without limitation to any content service provider or content-providing logical "network" such as e.g., ABC, NBC, CBS, etc., regardless of delivery platform or underlying content distribution network infrastructure (see below).

As used herein, the terms "network" and "bearer network" (distinguished from "network content provider" supra) refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2, USB 3.0), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., LTE/LTE-A, 3GPP, 3GPP2, UMTS), or IrDA families.

As used herein, the terms "personal media device" and "PMD" refer to, without limitation, any device, whether portable or otherwise, capable of storing and/or rendering media.

As used herein the term "SCTE 130" refers without limitation to SCTE 130-1 2013: Digital Program Insertion—Advertising Systems Interfaces Part 1—Advertising Systems Overview; SCTE 130-2 2008a: Digital Program Insertion—Advertising Systems Interfaces Part 2—Core Data Elements; SCTE 130-3 2010: Digital Program Insertion—Advertising Systems Interfaces Part 3—Ad Management Service Interface; SCTE 130-3 2013: Digital Program Insertion—Advertising Systems Interfaces Part 3—Ad Management Service Interface; SCTE 130-4 2009: Digital Program Insertion—Advertising Systems Interfaces Part 4—Content Information Service; SCTE 130-5 2010: Digital Program Insertion—Advertising Systems Interfaces Part 5—Placement Opportunity Information Service; SCTE 130-6 2010: Digital Program Insertion—Advertising Systems Interfaces Part 6—Subscriber Information Service; SCTE 130-7 2009: Digital Program Insertion—Advertising Systems Interfaces Part 7—Message Transport; SCTE 130-8 2010a: Digital Program Insertion Advertising Systems Interfaces Part 8—General Information Service; SCTE 130-9 2014: Recommended Practices for SCTE 130 Digital Program Insertion—Advertising Systems Interfaces; and SCTE 130-10 2013: Digital Program Insertion—Advertising Systems Interfaces Part 10—Stream Restriction Data Model, each of the foregoing incorporated by reference herein in its entirety.

As used herein, the term "secondary content" refers without limitation to content other than primary programming content, such as e.g., advertisements, promotions, "telescoping" content, info-mercials, trailers, icons or animated overlays, etc. which may be presented either alone or in conjunction with the primary (or yet other) content.

As used herein, the term "server" refers to, without limitation, any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein the term "VAST" includes, without limitation, the IAB Digital Video Ad Serving Template (VAST) versions 1.0, 1.1, 2.0, 2.01, 3.0 and 4.0, and VMAP (Digital Video Multiple Ad Playlist) versions 1.0 and 1.01, each of the foregoing incorporated herein by reference in its entirety.

As used herein the term "VPAID" includes, without limitation, the IAB Digital Video Player-Ad Interface Definition (VPAID) versions 1.0, 2.0 and 3.0, each incorporated herein by reference in its entirety.

As used herein, the term "Wi-Fi" refers to, without limitation, any of the variants of IEEE-Std. 802.11 or related standards including 802.11 a/b/g/n/s/v/ac or 802.11-2012, as well as so-called "Wi-Fi Direct", each of the foregoing incorporated herein by reference in its entirety.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee, RFID/NFC, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present invention discloses, inter alia, methods and apparatus for efficiently storing and subsequently providing primary content (e.g., linear or VOD content) having secondary content (e.g., advertisements or promotions, infomercials, telescoping advertisements) that would have played when the recording occurred inserted therein, or otherwise associated therewith. In this fashion, the state of the primary content at time of recording is preserved, yet without having to consume large amounts of data storage to actually store the primary and secondary content as it originally would have been delivered.

In one exemplary implementation, a network-based management process is configured to identify the original advertisements scheduled when the primary content recording was effected or requested, as well as determining whether the content recording is being requested within a certain time window from the original air time of that content (e.g., within the C3 or C7 window). This approach advantageously provides, inter alia, the opportunity for the network operator to preserve measurement requirements, and/or meet other obligations associated with the delivery of secondary content (e.g., to observe contractual or business requirements between the network operator and an advertiser or content source). Advertising comprises a major source of revenue for the network operator, and hence network operator profitability can be enhanced through implementation of the foregoing techniques, without having to add storage capacity or significantly modify extant network infrastructure.

In one variant, a Campaign Management System (CMS) is provided, which takes advantage of associating campaigns based on a time period "in the past" (e.g., via use of one or more historic records regarding the advertisement placement for each user individually). This approach also preserves the aforementioned measurement requirements and/or contractual/business arrangements, while further providing the ability to vary advertising content prior to distributing a program to the client device (e.g., dynamically, in response to changing events or conditions) when no window or other restrictions are present.

In another variant, the secondary content decisions made by the disclosed techniques return the original advertisement that would have played when the recording was effected, yet based on data that is generated after the time of recording (e.g., in a "look back" fashion).

In another variant, the apparatus and methods include a reporting functionality that provides a gap assessment of the accuracy of placed advertisements versus original placements.

Other features and advantages of the present disclosure, including improvements to computerized technology, will immediately be recognized by persons of ordinary skill in the art with reference to the attached drawings and detailed description of exemplary embodiments as given below.

Detailed Description of Exemplary Embodiments

Exemplary embodiments of the apparatus and methods of the present disclosure are now described in detail. While these exemplary embodiments are described in the context of a managed content distribution network (e.g., hybrid fiber coax (HFC) cable) architecture having a multiple systems operator, digital networking capability, and plurality of client devices/CPE, and Internet delivery via e.g., RF QAM and DOCSIS cable modem, the general principles and advantages of the disclosure may be extended to other types of networks, architectures and applications, whether broadband, narrowband, wired or wireless, terrestrial or satellite, managed or unmanaged (or combinations thereof), or otherwise, the following therefore being merely exemplary in nature.

It will also be appreciated that while described generally in the context of a network providing service to a customer or consumer or end user (i.e., residential), the present disclosure may be readily adapted to other types of environments including, e.g., commercial/retail, or enterprise domain (e.g., businesses), and government/military applications. Myriad other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (Ipv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

It will further be recognized that various aspects of the present disclosure may lend themselves to any number of different content delivery paradigms and/or temporal relationships. For example, in one variant, the primary content being recorded/delivered comprises linear or broadcast content. In another paradigm, OD content (i.e., originally available in an OD delivery model from e.g., a VOD server, and which can be subsequently watched by the user within for example a prescribed time period after initial viewing) has its original secondary content "state" preserved, so that subsequent viewings by the user within the C3 or C7 windows will return the originally inserted advertisements.

In yet another model, Internet content is broadcast or delivered on-demand, such as in response to an affirmative user selection via e.g., a PC, mobile device or on-screen user interface, and can act as the basis of the preserved state data.

In yet another approach, an Internet content stream is delivered to the subscriber and recorded, such as by a digital video recorder (DVR), the content being stored on a network-based (e.g., cloud) or even local repository (e.g., hard drive or other mass storage device). For example, the nPVR or nDVR delivery paradigms (such as those described in co-owned U.S. Pat. No. 7,457,520 issued Nov. 25, 2008 and entitled "Technique for providing a virtual digital video recorder service through a communications network" incorporated herein by reference in its entirety, as well as so-called "start-over" applications such as those described in co-owned U.S. patent application Ser. No. 10/913,064 filed Aug. 6, 2004, published as U.S. Patent Publication No. 2005/0034171 and entitled "Technique for delivering programming content based on a modified network personal video recorder service" incorporated herein by reference in its entirety, may be utilized consistent with the present disclosure for, inter alia, network-side recordation of primary content, state/context and/or temporal data, and even secondary content where required.

It is appreciated that for delivery via the DVR, nPVR, nDVR, or start-over delivery paradigms referenced above, the internet content may be stored on a hard disk drive (HDD) or flash memory (e.g., NAND flash) of the storage device, whether located at the customer's premises, head-end, network hub, remote server, etc.

In one implementation of the foregoing, a content and data distribution network comprising primary content sources and secondary content sources, at least one content server, and management entities which cooperate to provide content (including secondary content) to various client devices (e.g., customer premises equipment (CPE) and portable media devices (PMD)) in communication with the network (including via a non-MSO network) is utilized. Various management entities are given which cooperate to provide VOD content having advertising or other secondary content inserted therein to the CPE and PMD. The inserted secondary content may include for example targeted advertisements (when the content is requested outside the aforementioned time period from the original air date) and time-based advertisements (when the content is requested within the aforementioned time period from the original air date), where the time-based advertisements include the original advertisements scheduled when the recording occurred and/or advertisements that are a part of campaigns associated with the campaign of the foregoing originally scheduled advertisements.

Secondary content insertion may be further managed in one variant by a "campaign manager", in accordance with various business rules.

In another embodiment, the present disclosure provides for the storage and delivery of recorded content stored at a network storage location (i.e., in the "cloud") and delivered over a network (hereinafter referred to as "cloud DVR" or "cDVR"). The storage and delivery of cDVR content in the present disclosure includes, inter alia, both storage and delivery of user-initiated cDVR events (i.e., instances wherein a user requests to have content recorded to a cloud-based digital video recorder), as well as real-time MSO-initiated cDVR events (i.e., instances wherein the MSO determines which content will be recorded, in real time, to a cloud-based digital video recorder). The improved apparatus and methods disclosed herein advantageously provide a high degree of platform heterogeneity and mobility (i.e., delivery of content to various different types of user client devices, and at differing physical locations), while also providing significant economies to the network operator or service provider in terms of efficient data storage and transmission.

In one variant of the foregoing embodiment, the improved apparatus of the present disclosure comprises one or more entities adapted to accomplish various content processing operations; e.g., a cDVR server adapted to utilize a compression storage system that significantly reduces virtual storage requirements. In one implementation, content assets are compressed in the aforementioned compression storage system after a threshold time duration is reached (e.g., 72 hours after receipt of an initial recording request from a user). The aforementioned compression storage system and/or cDVR server utilizes a randomized sequence allocation/assignment with numeric complements adapted to create a large number of unique combinations of the stored content elements, and stream them to the client device(s) of network users or households via a unique path. The improved apparatus of the invention advantageously obviates excessive (and often unused) content storage, and facilitates pre-streaming processing within the cDVR system.

Thus, in one exemplary scenario of the present disclosure, before a certain time period from the original air time of the content, uncompressed content asset are in cloud storage until either a request for playback is received, the certain time period is reached, or the asset is purged from the system. If a request for playback is received the certain time period from the original air time of the content, the original advertisements scheduled when the recording occurred and/or advertisements that are a part of campaigns associated with the campaign of the foregoing originally scheduled advertisements are provided to the user (either when the call is made to the advertising server or as part of the assembled primary content). However, if a request for playback is received at or after the certain time period from the original air time of the content, targeted secondary content is permitted, and the uncompressed content assets are compressed and delivered to the requesting user.

In another variant, the threshold time period with respect to compressing the content may be more or less than the time period regarding time-based advertisement placement. Thus, in one implementation, when (i) the threshold time period with respect to compressing the content is less than the time period regarding time-based advertisement placement, and (ii) the user requests the stored/recorded content after he threshold time period with respect to compressing the content but before the time period regarding time-based advertisement placement, then the primary and/or time-based secondary content (the original advertisements scheduled when the recording occurred and/or advertisements that are a part of campaigns associated with the campaign of the foregoing originally scheduled advertisements) are compressed and delivered to the requesting user.

In another aspect of the disclosure, a reporting method is disclosed which allows the MSO (e.g., studios, networks, advertisers, etc.) to utilize gap assessments of the accuracy of placed advertisements versus original placements In one variant, a client application is run on the microprocessor of the client device to facilitate the secondary content insertion of the invention by providing information regarding the subscriber/user (and/or device) to headend entities charged with inserting secondary content (e.g., the management entities discussed elsewhere herein). For example, the client application may provide subscriber, account, or other information upstream in order for the insertion entities to identify the subscriber, and provide content based on what is known about that particular subscriber. In addition, the client application may be configured to collect information regarding the user's actions with respect to content (such as actions taken with respect to previously displayed advertisements). For example, the client application may tune-in or tune-away records, etc., with respect to certain advertisements shown to the user in the past, and pass this information to the headend entities, which can then associate one or more campaigns with each other.

In yet another embodiment, the aforementioned headend entities charged with inserting secondary content may provide the playlist of available secondary content, and/or the secondary content itself, directly to the CPE for storage thereon. The client application in this embodiment dynamically causes insertion of the provided secondary content. A proxy store (e.g., network store, web server, etc.) may also provide the secondary content directly to the CPE or client, such as via a URL provided to the client or CPE via a manifest file or schedule.

Managed Service Provider Network—

FIG. 1 illustrates a typical service provider network configuration useful with the features of the time-based dynamic advertisement placement call system described herein. The various components of the network 100 include (i) one or more data and application origination points 102; (ii) one or more content sources 103, (iii) one or more application distribution servers 104; (iv) one or more video on-demand (VOD) servers 105, and (v) client devices or CPE 106. The application distribution server(s) 104, VOD servers 105, and client device(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, application distribution servers, VOD servers, and/or client devices (as well as different network topologies) may be utilized consistent with the present disclosure. For example, the headend architecture of FIG. 1a (described in greater detail below), or others, may be used.

The data/application origination point 102 comprises any medium that allows data and/or applications (such as a VOD-based or "Watch TV" application) to be transferred to the application distribution server 104. This may include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications enter the network system. Application distribution servers are well known in the networking arts, and accordingly not described further herein.

The VOD server 105 comprises a computer system where on-demand content is received from one or more of the aforementioned data sources 102 and enter the network system. These servers may generate the content locally, or alternatively act as a gateway or intermediary from a distant source.

The client device 106 includes any equipment in the "customers' premises" (or other locations, whether local or remote to the application distribution server 104) that may be accessed by an application distribution server 104.

The VOD server 105 and application distribution servers 104 are a part of the headend architecture of the network 100. The headend is connected to an internetwork (e.g., the Internet).

Figure 1A:
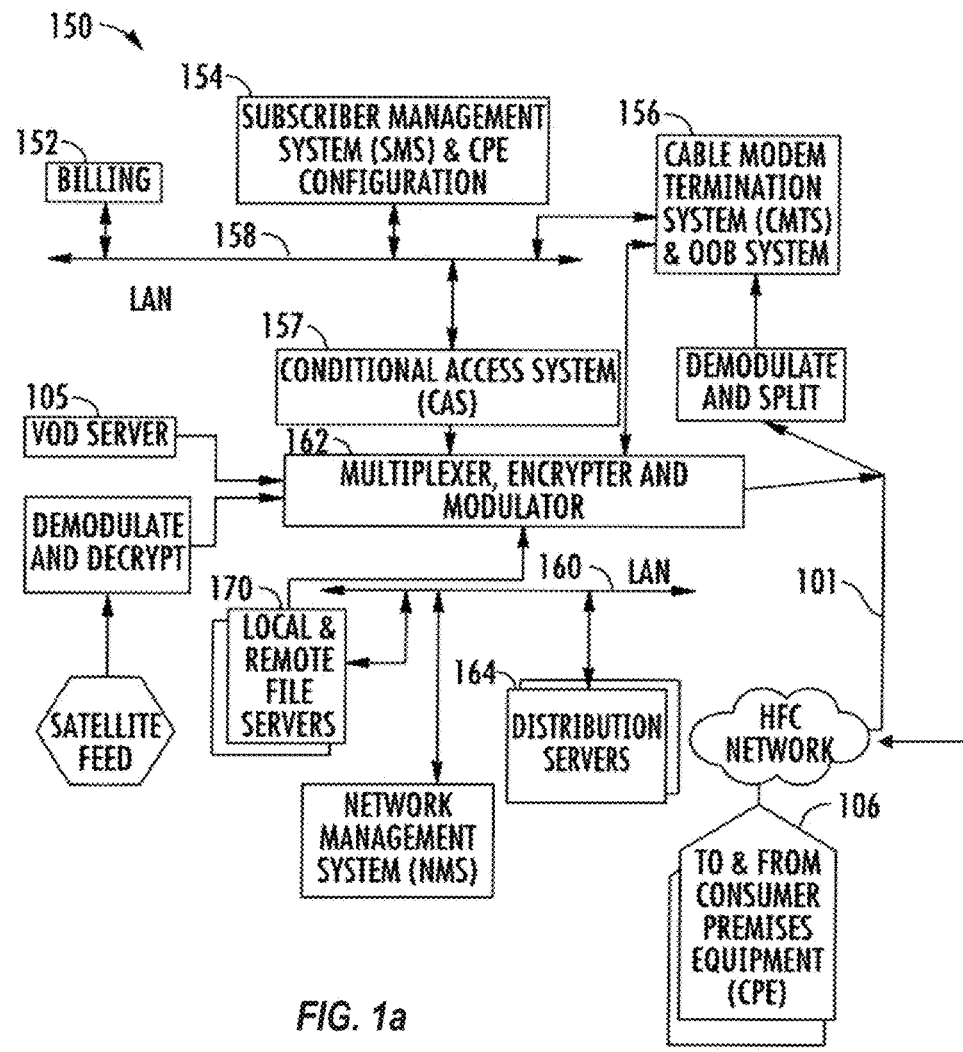
FIG. 1a is a functional block diagram illustrating one exemplary HFC cable network headend configuration useful with the present disclosure.
Figure 1A:
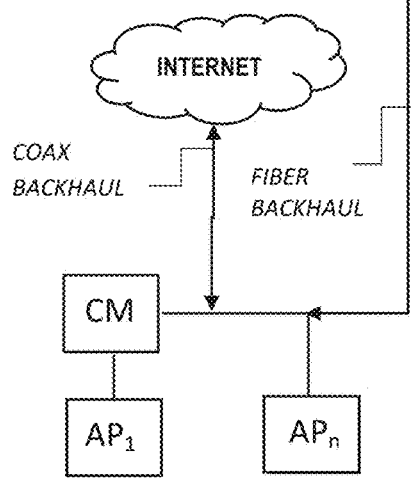

FIG. 1a shows one exemplary embodiment of a headend architecture. As shown in FIG. 1a, the headend architecture 150 comprises typical headend components and services including billing module 152, subscriber management system (SMS) and client/CPE configuration management module 154, cable modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Moreover, the functions described below with respect to FIGS. 2-3 can be (i) co-located at one or more centralized locations within the network (e.g., at one or more regional headends, or national "super" headends), (i) distributed throughout various disparate locations of the MSO-managed network; or (iii) distributed at various locations within and external to the MSO-managed network (e.g., use assets, sources, etc. which are maintained by one or more third party data sources or providers).

Figure 1B:
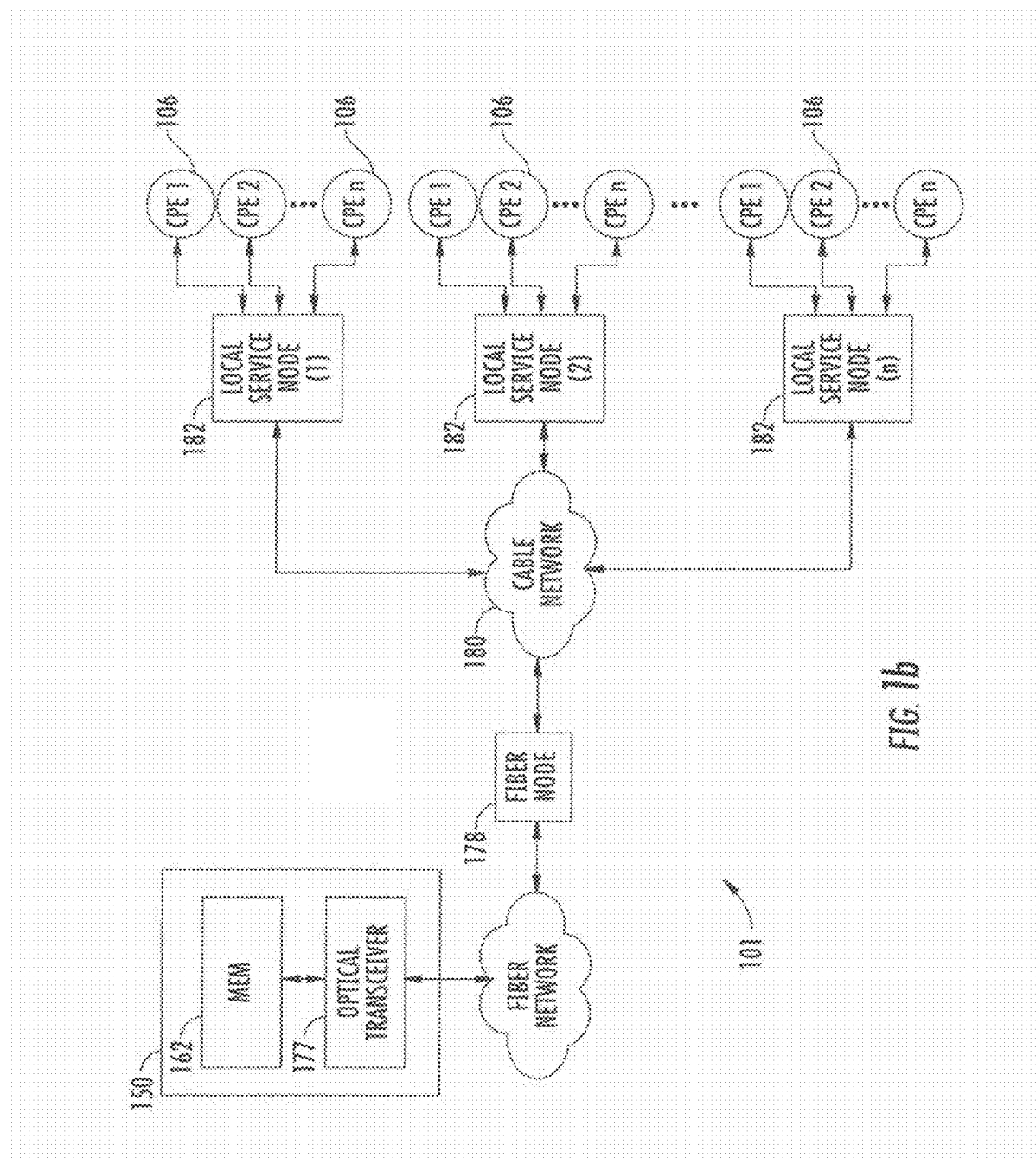
FIG. 1b is a functional block diagram illustrating one exemplary local service node configuration useful with the present disclosure.

The exemplary architecture 150 of FIG. 1a further includes a conditional access system (CAS) 157 and a multiplexer-encrypter-modulator (MEM) 162 coupled to the HFC network 101 adapted to process or condition content (including e.g., secondary content such as advertisements) for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the client devices/CPE 106 ("downstream") are multiplexed together in the headend, as previously described and sent to neighborhood hubs (as shown in the exemplary scheme of FIG. 1b) via a variety of interposed network components.

Content (e.g., audio, video, data, files, etc.) is provided in each downstream (in-band) channel associated with the relevant service group. To communicate with the headend or intermediary node (e.g., hub server), the client devices/CPE 106 may use the out-of-band (OOB) or DOCSIS channels and associated protocols, although the present disclosure is in no way limited to these approaches.

Figure 1C:
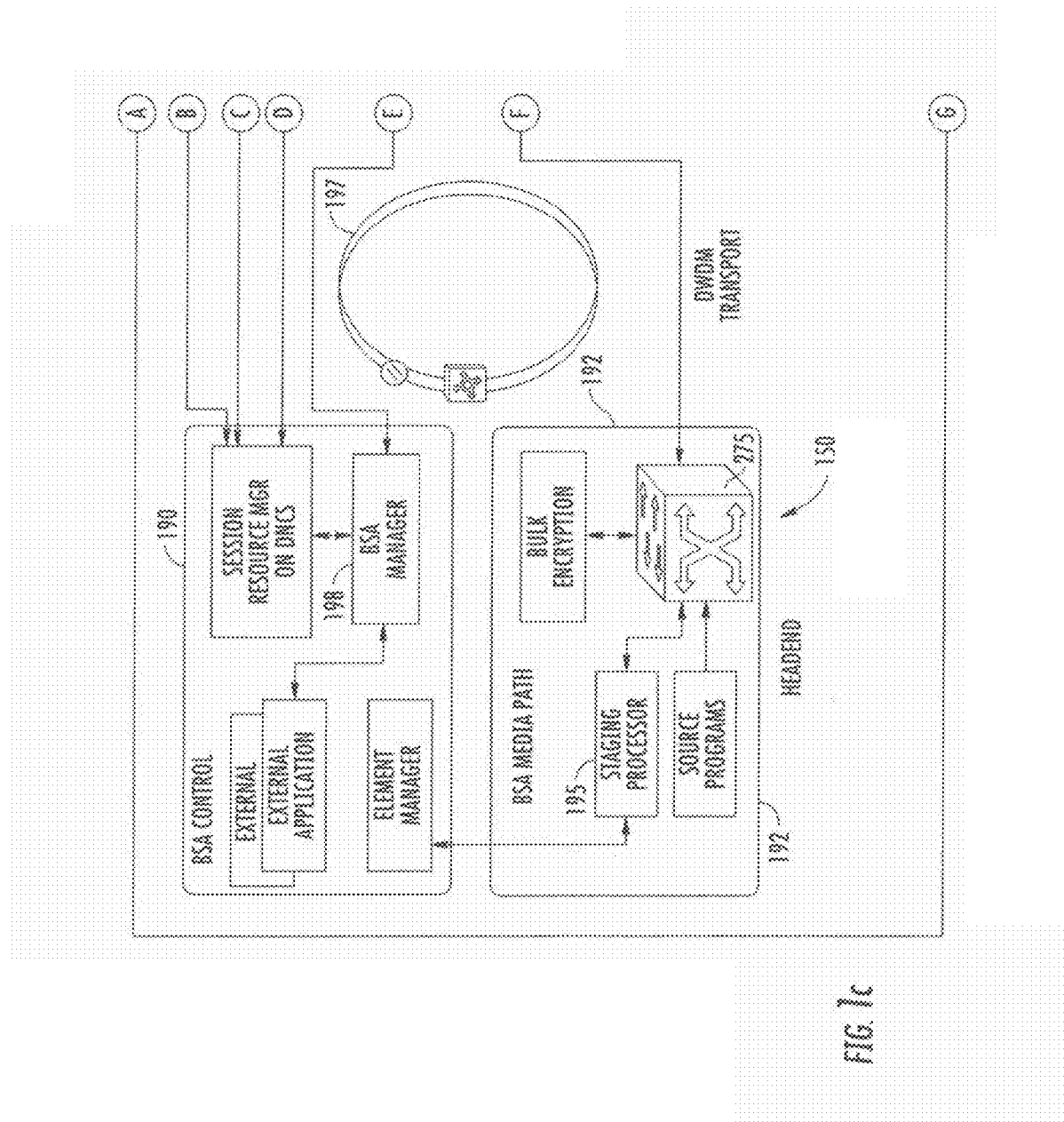
FIG. 1c is a functional block diagram illustrating one exemplary broadcast switched or switched digital video (SDV) network architecture useful with the present disclosure.
Figure 1C:
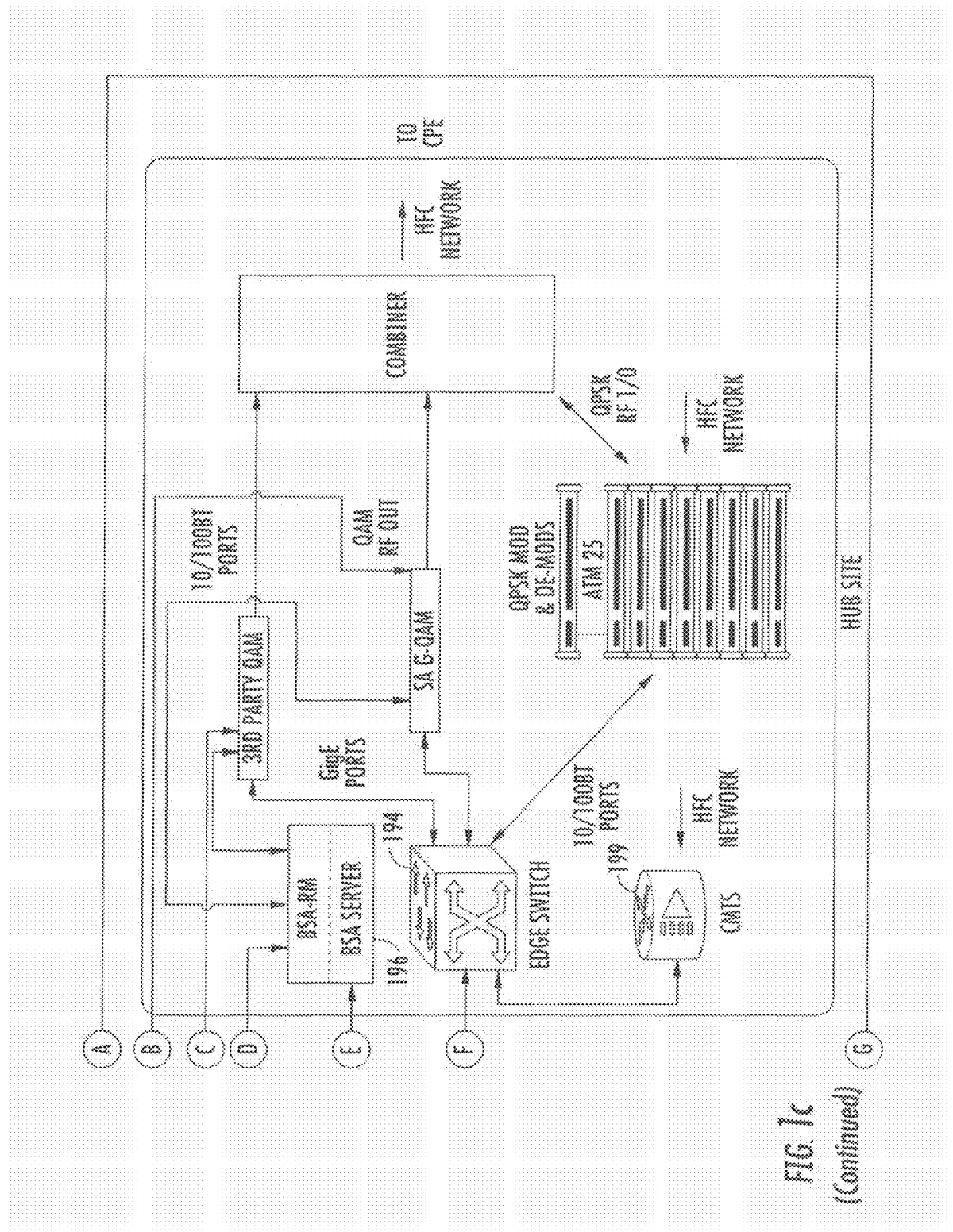

FIG. 1c illustrates an exemplary "switched" network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. Broadcast switched architecture (BSA, also referred to as "Switched Digital Video" or SDV) media path 192 may include a staging processor 195, source programs, and bulk encryption in communication with a switch 275. A BSA/SDV server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user client devices (including IP-based STBs or IP-enabled consumer devices) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's client device or other IP-enabled device via the user's cable modem. Delivery in such packetized modes may be unicast, multicast, or broadcast.

Referring again to FIG. 1c, the IP packets associated with Internet services are received by the edge switch 194, and in one embodiment forwarded to the cable modem termination system (CMTS) 199. The CMTS examines the packets, and forwards packets intended for the local network to the edge switch 194. Other packets are discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

Figure 5:
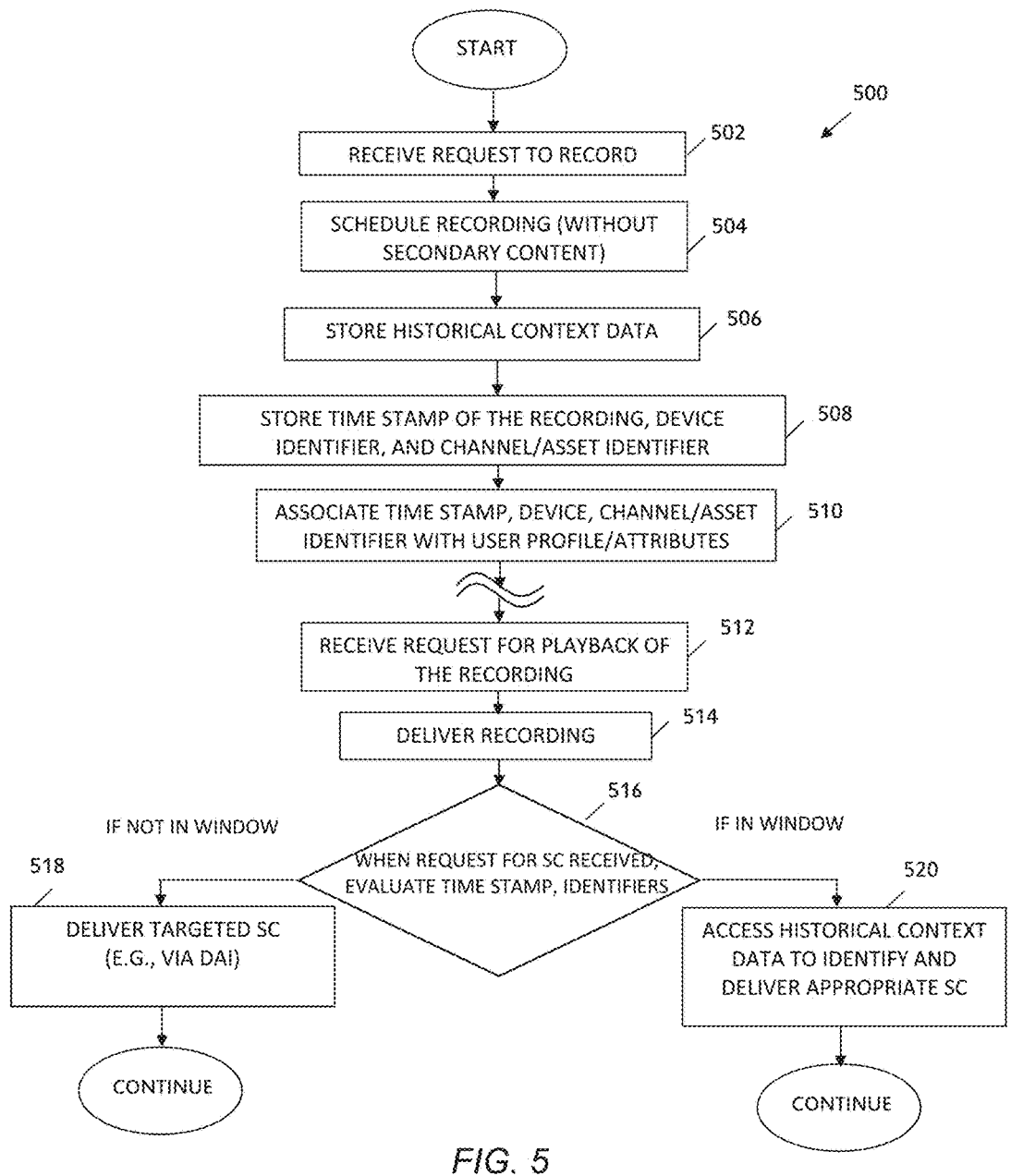
FIG. 5 is a logical flow diagram illustrating yet another exemplary embodiment of a method for enabling time-based dynamic secondary content placement calling in accordance with the disclosure.

The edge switch 194 forwards the packets received from the CMTS 199 to the QAM modulator, which transmits the packets on one or more physical (QAM-modulated RF) channels to the CPE/client devices. The IP packets are typically transmitted on RF channels (e.g., DOCSIS QAMs) that are different that the RF channels used for the broadcast video and audio programming, although this is not a requirement. The client devices/CPE 106 are each configured to monitor the particular assigned RF channel (such as via a port or socket ID/address, or other such mechanism) for IP packets intended for the subscriber premises/address that they serve. For example, in one embodiment, a business customer premises obtains its Internet access (such as for a connected Wi-Fi AP) via a DOCSIS cable modem or other device capable of utilizing the cable "drop" to the premises (e.g., a premises gateway, etc.); see the discussion of FIG. 5 presented infra.

Figure 1D:
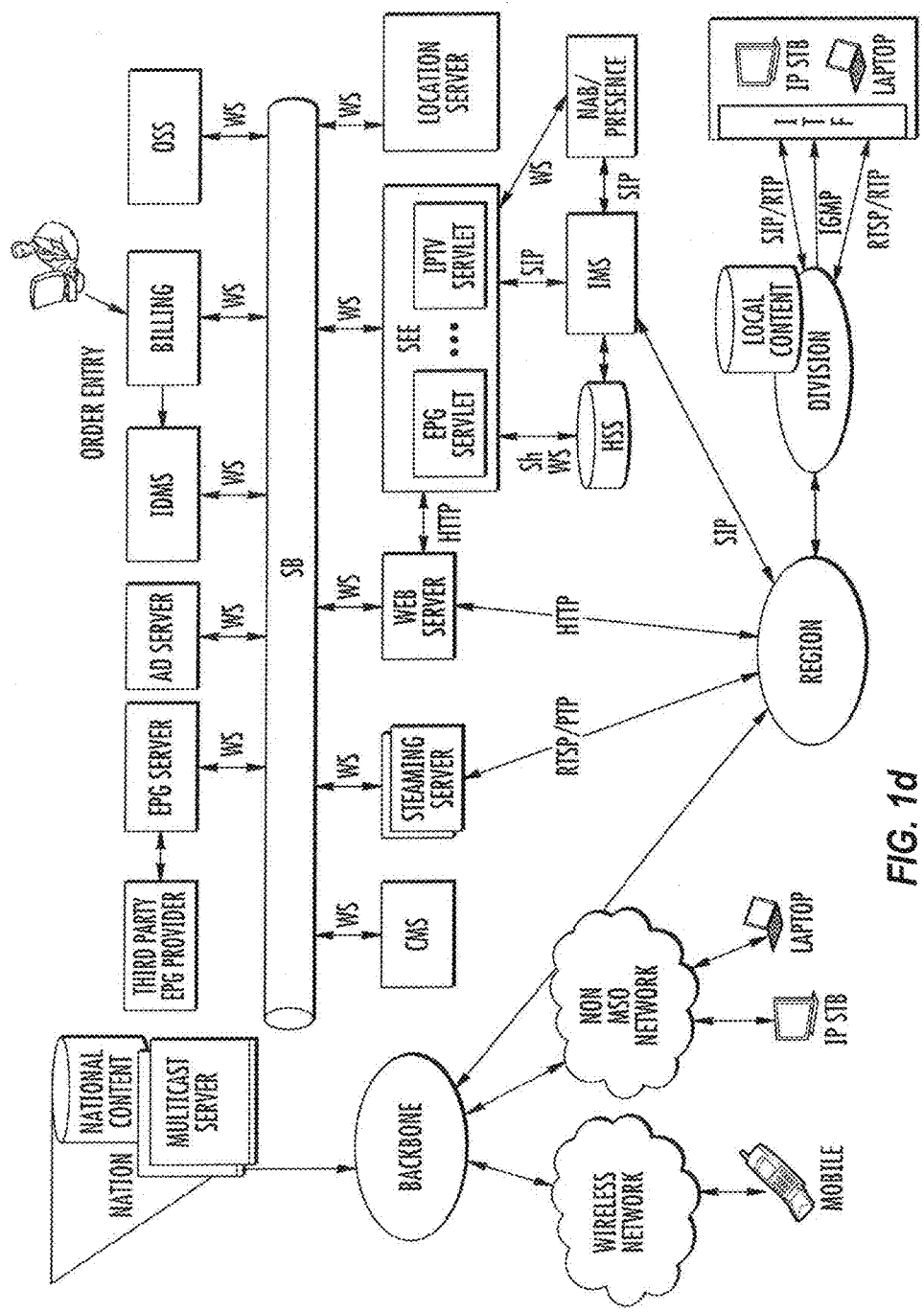
FIG. 1d is a functional block diagram illustrating one exemplary packetized content delivery network architecture useful with the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., Internet data, IPTV content, etc.). FIG. 1d illustrates one exemplary implementation of such a network, in the context of a 3GPP IMS (IP Multimedia Subsystem) network with common control plane and service delivery platform (SDP), as described in co-owned and co-pending U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title, incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Advertisement Placement Architecture—

Figure 2:
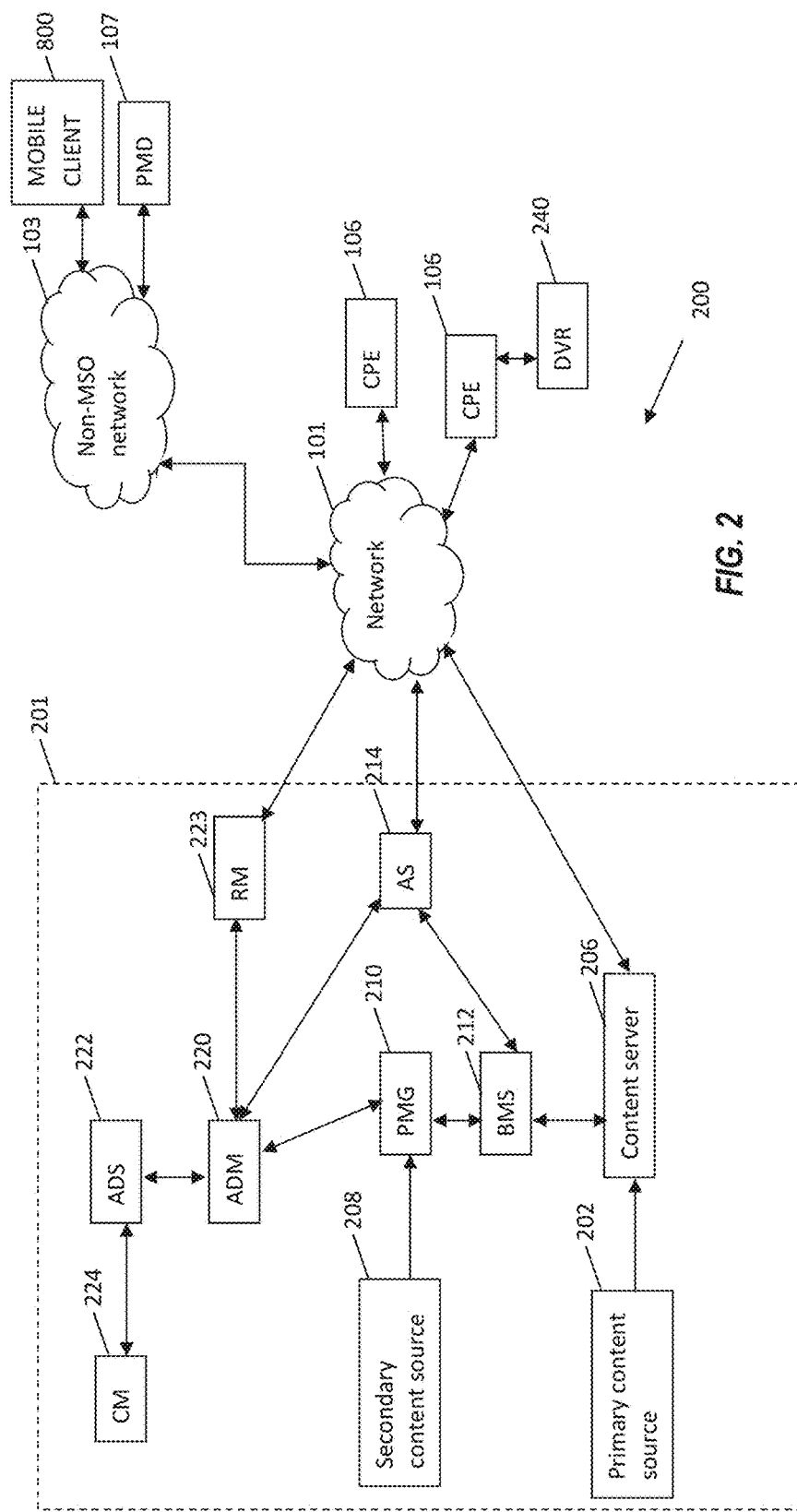
FIG. 2 is a high-level functional block diagram of a content and data distribution network architecture configured in accordance with one embodiment of the present disclosure.

FIG. 2 is a high-level block diagram of a content and data distribution network architecture 200 in accordance with one embodiment of the disclosure. While exemplary embodiments of the architecture are shown and described herein, it will also be appreciated that various portions of the architectures and components thereof may be implemented consistent with the requirements and guidelines set forth in ANSI/SCTE-130 standards, as previously defined herein.

As illustrated, the exemplary network architecture 200 of FIG. 2 generally comprises a plurality of CPE 106 adapted to receive content and data via a content delivery network 101 (e.g., the HFC network of FIG. 1), which in turn receives content and data from a headend content and data distribution network 201.

In one embodiment, the headend content and data distribution network 201 comprises a plurality of entities located at one or more headend 150 (see FIG. 1). As shown, the headend distribution network 201 comprises primary content sources 202 and secondary content sources 208, at least one content server 206 (e.g., a VoD server 105 such as that shown in FIG. 1), and management entities which cooperate to provide content (including time- and/or context-based, or targeted secondary content) to various clients 800 and portable media devices (PMD) 107 in communication with the network 101 (including via a non-MSO network 103 such as via a wireless, fiber, or other transport implemented in a managed or ad hoc network such as a Wi-Fi enterprise or residential network). The management entities include e.g., an advertisement management system, advertisement delivery manager, or advertisement decision manager (collectively and individually referred to as "ADM") 220, an advertisement decision service (ADS) 222, and a campaign manager (CM) 224.

In one embodiment, communication between the content and data distribution network 201 and CPE 106, client 800 (and/or PMD 10)7 may occur as discussed in previously incorporated co-owned U.S. application Ser. No. 12/764,746 and entitled "METHODS AND APPARATUS FOR PACKETIZED CONTENT DELIVERY OVER A CONTENT DELIVERY NETWORK". As discussed therein, a substantially session-based and packetized content delivery approach (e.g., using the well-known Internet Protocol) which allows for temporal, device, and location flexibility in the delivery of the content, and transportability/migration of user sessions (i.e., allows a user to receive any content they desire, delivered at any time and at any location, and on any device they choose), as well as service/content personalization (e.g., on a per-session/user basis) and blending (integration). This approach uses a common or unified delivery architecture in providing what were heretofore heterogeneous services supplied by substantially different, and often vendor-specific, networks. However, it will be appreciated that literally any architecture capable of supporting IP protocol communications may be used.

In one variant of this approach, network services are sent OTT or "over-the-top" of other provider's infrastructure, thereby making the service network substantially network-agnostic. In another variant, a cooperative approach between providers is utilized, so that features or capabilities present in one provider's network (e.g., authentication of mobile devices) can be leveraged by another provider operating in cooperation therewith.

In another embodiment, content may be provided from the content and data distribution network 201 to the CPE 106, client 800 and/or PMD 107 as described in co-owned U.S. patent application Ser. No. 11/258,229 filed on Oct. 24, 2005 and entitled "METHOD AND APPARATUS FOR ON-DEMAND CONTENT TRANSMISSION AND CONTROL OVER NETWORKS", which is incorporated herein by reference in its entirety. As discussed therein, data may be provided according to download or "on demand" paradigms. In one embodiment, the network comprises a cable television network connected with a CSP (cellular service provider) or wireless service provider (WSP), and on-demand content delivery is accomplished via a "point-to-point" approach wherein a session is established between a content receiving entity (such as a cellular telephone) and a distributing entity (e.g., a VOD server). Session establishment and data flow control are advantageously implemented using protocols and bandwidth that are typically used for (i) providing on-demand services to subscribers within the cable network, and (ii) delivery and control of streaming multimedia to client mobile devices.

In yet another embodiment, content may be purchased and/or received at a device in a remote network as discussed in co-owned U.S. patent application Ser. No. 11/440,490 filed on May 24, 2006, entitled "PERSONAL CONTENT SERVER APPARATUS AND METHODS", and issued as U.S. Pat. No. 8,280,982 on Oct. 2, 2012, which is incorporated herein by reference in its entirety. As discussed therein, access to content (e.g., program viewing) delivered over a content-based network via other networks or communication channels outside of the content-based network are provided. For example, in the context of a cable television network, programming or other content delivered to a subscriber over the cable network can be accessed via other (secondary) networks such as the Internet, LANs/WANs/MANs, a wireless service provider (WSP) network, cellular service provider (CSP) network, or even a satellite network. In one embodiment, a personal content server located, e.g., at the head-end of the bearer (cable) network may be used to distribute content to the remote requesting location(s), thereby eliminating repetitious traffic to and from subscriber's premises to fulfill the requests for remote content delivery.

Yet other mechanisms and architectures for providing content to PMDs or CPE located in or out of a managed network may be used consistent with the invention as well, the foregoing being merely exemplary of the broader principles.

Figure 2A:
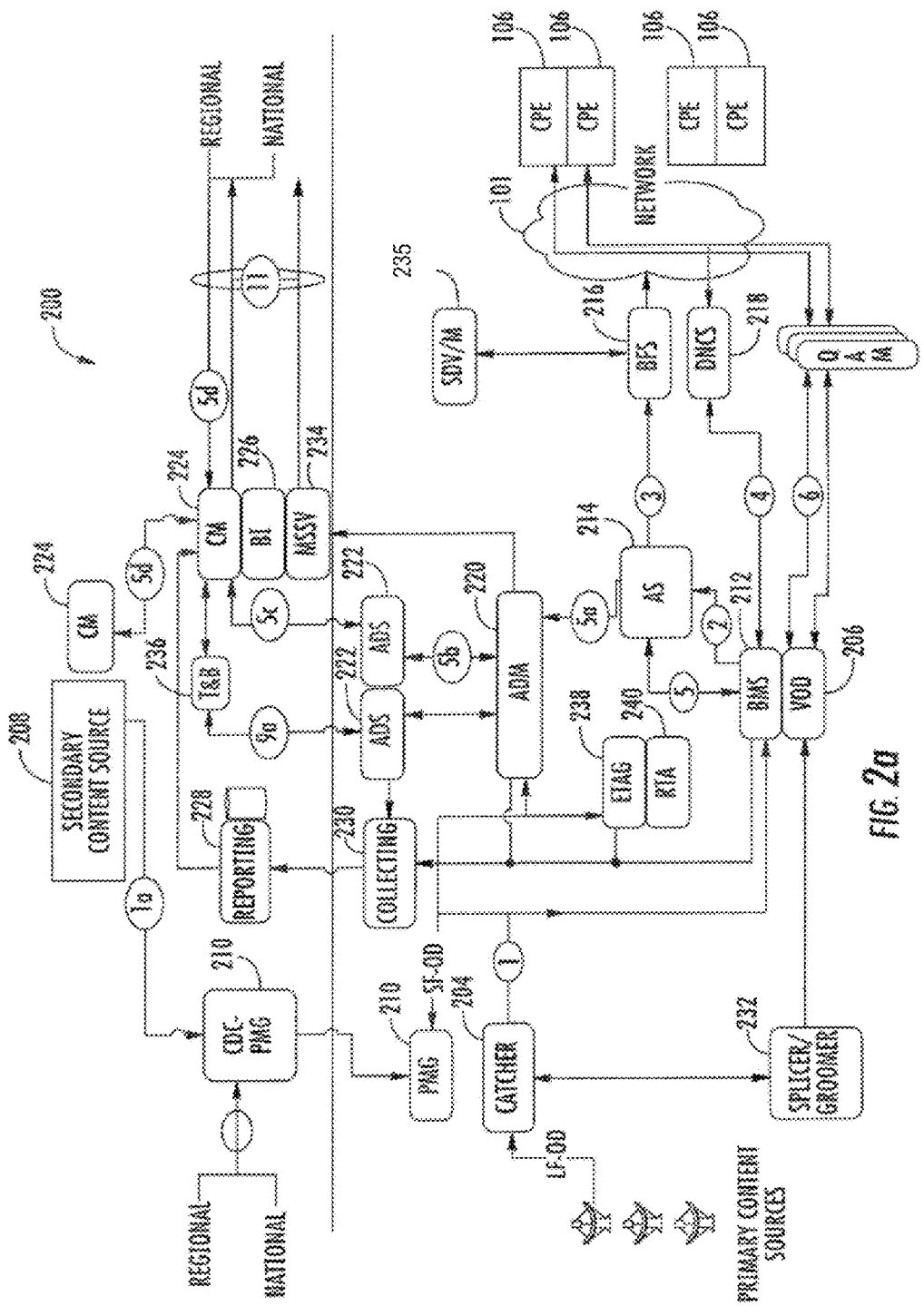
FIG. 2a is a detailed functional block diagram of the exemplary content and data distribution network architecture of FIG. 2.

Referring now to FIG. 2a, a block diagram illustrating further details of one exemplary implementation of the content and data distribution network architecture 200 of FIG. 2 is shown. As illustrated, this implementation comprises primary content (e.g., VOD content) sources 202 and secondary content (e.g., advertisement content) sources 208, at least one VOD content server 206, an application server 214, and various management entities including e.g., an advertisement management system (ADM) 220, an advertisement decision service (ADS) 222, a campaign manager (CM) 224, a package media gateway (PMG) 210 (see FIG. 2), and a business management system (BMS) 212. The PMG 210 in the illustrated embodiment performs content packaging and movement throughout the network. The PMG 210 also acts as a storage and forwarding device, allowing the content to be "manipulated". The BMS 212 is a VOD back office component including metadata management and package/entitlement management functions. The aforementioned components, similar to those discussed above with respect to FIG. 2, cooperate to provide VOD content having advertisement content inserted therein to the CPE 106, client 800 and/or PMD 107 in communication via the network 101 (and/or via a non-MSO network (not shown) in communication with the network 101).

Additional headend entities are provided in the detailed embodiment of FIG. 2a whose function will be discussed subsequently herein. These entities also work in conjunction with the aforementioned content sources (202, 208), management entities (220, 222, 224, 210, 212), and content server (206, 214), in order to provide authorization and content to the CPE 106 and/or PMD 107.

It is further appreciated that one or more of the aforementioned components may be disposed at various other locations as desired consistent with the architecture implemented (e.g., closer to the network edge, such as at the BSA hub in a BSA network).

Metadata regarding the assets stored at the VOD server 206 is maintained, and utilized to catalogue and carousel the offerings by the broadcast file system (BFS) 216. The BFS 216 performs the basic function of a data carousel. In the illustrated embodiment, a switched digital video manager (SDV/M) 235 is consulted to see if there is available bandwidth to support the playout of additional stream in a shared bandwidth model. In another embodiment, a global resource session manager or GSM (not shown) may be used to manage the resources in the network.

One or more advertisement content sources 208 are also illustrated. Advertisement content is received from the advertisement content sources 208 and via the PMG 210. The secondary content is transmitted to the enhanced TV application gateway (ETAG) 238 and HTA 240. The ETAG 238 is responsible for the "spooling"/streaming of interactive content (EBIF) and receiving any responses from the clients. The secondary content is also delivered from the PMG 210 to the VOD server 206. In this manner, the advertisement content may be inserted into other VOD content prior to delivery to the users.

FIG. 2a further illustrates that the advertisement content is provided as short form content to the VOD server 206. The campaign manager (CM) 224, advertisement decision service (ADS) 222, recording manager 223, and advertisement management system (ADM) 220 cooperate to manage insertion/placement of the secondary content (e.g., advertisements) into/with the primary content (e.g., VOD content).

Communication between the CM 224 and ADS 222 occurs via the traffic and billing interface (T&B) 236. The T&B system 236 traffics linear advertising insertion, and is responsible for producing affidavits for billing purposes. The interface between the CM 224 and may comprise e.g., any number of CCMS (Content and Campaign Management System) schedule files, or other appropriate interface/file transfer mechanisms. In one embodiment of the present disclose, the schedule files are imported from the CCMS to the ADS 222 or any other management entity consistent with the present disclosure in order to identify the advertisements scheduled at the time the broadcast content was recorded or stored. The ADM 220 communicates with the CM 224 via an entity providing a centralized view of all the advanced advertising systems in network (MSSV 234) and business intelligence (BI) 226 entities.

In one embodiment, the ADM 220 and ADS 222 are of the type discussed in co-owned U.S. patent application Ser. No. 12/503,749 filed on Jul. 15, 2009, entitled "METHODS AND APPARATUS FOR EVALUATING AN AUDIENCE IN A CONTENT-BASED NETWORK", and issued as U.S. Pat. No. 9,178,634 on Nov. 3, 2015, which is incorporated herein by reference in its entirety.

In another embodiment, the ADM 220 and ADS 222 are adapted to comply with the requirements set forth in the Society of Cable Telecommunications Engineers SCTE 130, including inter alia, SCTE 130-1, 130-2, and SCTE 130-3 Digital Program Insertion—Advertising Systems Interfaces standards, each of which is incorporated herein by reference in its entirety.

The ADM 220 is utilized to select individual ones of a plurality of secondary content for delivery to individual ones of the CPE 106 via an application server (AS) 214. The ADM 220 is in communication with the ADS 222; the ADS 222 determines individual ones of the plurality of secondary content from the content store to deliver to the CPE 106 based in part on data collected from a headend collecting entity such as the RM 223. The collected data, in one exemplary embodiment, may include a time stamp of the original recording when an advertisement call is made dynamically. In another embodiment, the collected data may include one or more historic records that pertain to previous advertisement placement for each requesting user individually, or households. The records may be used to associate secondary content campaigns based on a time period in the past.

The AS 214 is the headend entity responsible for monitoring viewing patterns of the various CPE 106, clients 800 or PMD 1-7, and providing content thereto based on the information collected by the monitored viewing patterns. The AS 214 may further enable dynamic insertion of secondary content prior to distribution, in accordance with one embodiment of the invention.

In one embodiment, the application server 214 comprises an application server (AS) such as that discussed in co-owned U.S. patent application Ser. No. 11/263,015 filed Oct. 2, 2002, entitled "NETWORK BASED DIGITAL INFORMATION AND ENTERTAINMENT STORAGE AND DELIVERY SYSTEM", published as U.S. Patent Application Publication No. 2003/0208767, and issued as U.S. Pat. No. 7,763,360 on Jul. 27, 2010, which is incorporated herein by reference in its entirety. In one variant, the present embodiment may take advantage of the start-over acquisition process to capture broadcast linear television after local advertisement insertion has occurred. Alternatively, in another embodiment, the network feed may be captured, and have the local advertisements inserted back into the stream from the VOD system. As discussed therein, the AS 214 monitors the content reserved and viewed by a user, and thus can create a profile relating to the user's interests. This profile may include the aforementioned one or more historic records, which be used to assist (the ADM 220 and ADS 222) in associating advertising and/or promotional campaigns. For example, the original advertisements in the broadcast at the time of recordation may be associated with previous advertising and/or promotional campaigns which were of most use and interest to the user (and therefore most effective for advertisers) based on a time period "in the past". Further, because reserved programs are recorded prior to distribution to a user, the AS 214 may provide the ability to vary advertising content prior to distributing a program to the CPE 106, clients 800 or PMD 107 (e.g., dynamically, in response to changing events or conditions).

In one embodiment, the campaign/advertisement association may be performed by a campaign manager 224. The campaign manager may comprise multiple components or processes which are either co-located or distributed across two or more entities (CM 224) within the content and data distribution network 200. The campaign manager (CM 224) enables an operator associated with MSO (or another entity) to control one or more aspects of secondary content selection and insertion/placement, therefore enabling an operator to ensure that the goals of the secondary content providers (e.g., advertisers) are accomplished. The CM 224 further allows the MSO to create and maintain billing schema for the various secondary content providers. The CM 224 may further be adapted to manage conflicts, and optimize business value or other business-related parameters such as profit and/or revenue.

Further, the CM 224 provides a user interface which enables the operator associated with the MSO to perform the campaign management functions described herein, whether in whole or part, as well as make adjustments to settings, or simply monitor activity.

The aforementioned concepts may be applied in the context of VOD programming presentation as well. In other words, since VOD programming is pre-stored at the VOD server, the AS 214 may perform one or more of the steps necessary for VOD session setup. Further, the ADM portion 220 may be responsible obtaining an advertisement decision and working with the VOD system to create a stream. The VOD system is responsible for the actual content splicing, multiplexing and transmitting to the user.

The time-based dynamic placement of secondary content is further monitored and controlled by the business management system (BMS) 212 of FIGS. 2 and 2a.

The ADM 220 and ADS 222 may be further utilized for reporting purposes. For example, the ADM 220 and ADS 222 may cooperate to transmit secondary content to CPE 106 (discussed above) and simultaneously send metadata regarding the secondary content to a collecting entity 230 and report generating entity 228. In one embodiment, the collecting entity 230 and report generating entities comprise e.g., Everstream™ products, such as the interactive data gateway (EV-IDG) product, and/or the interactive data warehouse (EV-IDW) product.

In one exemplary embodiment of the present disclosure, the ADM 220 and/or ADS 222 (as well as the collecting entity 230 and report generating entity 228) may be utilized to create a fidelity report based on the accuracy of the advertisements placed in the originally delivered content and the originally aired content/advertisement. Such report may contain for example, data relating to the placement and consumption of the advertising, such as e.g., time/date of start of the ad, the duration that the advertisement ran, and other activity relating to the advertisement (such as whether the advertisement was skipped or a trick mode command was utilized during playout). This data is useful in assessing coherence of the actual advertising delivery as compared to the proposed or purchased campaign (e.g., to enable demonstration of consumption for purposes of billing, or performance).

In another embodiment, a content information service (CIS), subscriber information service (SIS) and/or placement opportunity information service (POIS) communicate with the ADM 220 and/or ADS 222 to provide metadata and other information thereto. The CIS is an interface which describes a logical service, it may be run on any entity managing metadata or on an entity in communication with a second entity containing metadata describing the content. The CIS sources metadata to consumers (via the ADM 220 and ADS 222). The CIS does not define how to move the content around, however a separate CIS implementation may be given to provide such functionality.

In one model, in order for content to be provided to a CPE 106 (or client or PMD), it must be determined that the CPE 106 or PMD 107 is "entitled" to the content. In one approach, this is accomplished via the methods and apparatus disclosed in co-owned U.S. patent application Ser. No. 12/536,724 filed on Aug. 6, 2009, entitled "SYSTEM AND METHOD FOR MANAGING ENTITLEMENTS TO DATA OVER A NETWORK", and issued as U.S. Pat. No. 8,341,242 on Dec. 25, 2012, which is incorporated herein by reference in its entirety.

As illustrated, the present system supports advertisement sales operations performed at both the regional and national levels. The centralized view of the entire footprint 11 is provided to monitor system activity and performance. CCMS schedule files or other transfer files 9A are obtained for planned or scheduled linear insertion. As discussed elsewhere herein, these schedule files may be imported into the ADS 222, e.g., to identify the advertisements scheduled at the time of recordation. The campaign management to campaign management interface 5D allows CM's from different entities to "exchange" and/or associate campaigns (e.g., by historic records for each individual user) and/or "placement opportunity" and inventory information.

In another embodiment, the headend architecture 201 may include a "cloud DVR" or cDVR server of the type described in co-owned and co-pending U.S. patent application Ser. No. 15/170,787 filed Jun. 1, 2016 and entitled "CLOUD-BASED DIGITAL CONTENT RECORDER APPARATUS AND METHODS", incorporated herein by reference in its entirety. As discussed therein, the cDVR server is adapted to utilize a compression storage system that significantly reduces virtual storage requirements. The compression storage system and/or cDVR server described therein utilize a randomized sequence allocation/assignment (e.g., Fibonacci) with numeric complements adapted to create a large number of unique combinations of the stored content elements, and stream them to the client device(s) of network users or households via a unique path. This system advantageously obviates excessive (and often unused) content storage, and facilitates pre-streaming processing within the cDVR system.

In another embodiment, all (or portions of) of the available primary and/or secondary content may be pushed to the edge of the network in order to facilitate more efficient transmission thereof to the client. In addition, the content may be pushed to edge devices, such as local service nodes, based on the applicability of the content to the group of devices serviced by the edge device (e.g., the service group associated with the node). For example, it may be determined that the CPE serviced by a particular local node are all within a given advertisement zone. Hence, secondary content specific to that advertisement zone may be pushed to the node which services that zone for more efficient delivery thereof.

In yet another implementation, at least a portion of the stored programming content is stored on a network-based storage device and within a storage area designated for use by the user (or an account of the user) only. For instance, the network-based methods and apparatus described in co-owned U.S. Pat. No. 8,122,479 issued Feb. 21, 2012 and entitled "METHODS AND APPARATUS FOR PROVIDING VIRTUAL CONTENT OVER A NETWORK", incorporated herein by reference in its entirety, may be used to effect user-specific or account-specific acquisition and storage of content elements, although it will be appreciated that other apparatus and methods may be used consistent with the present disclosure.

In one such approach, only a particular portion of a copyrighted digital content element (e.g., linear broadcast, VOD movie, etc.) is stored within a storage area designated for use by the user only, yet this portion is needed to properly decode and render the content element as a whole (when combined with the remainder of the content element, the latter which is stored in a non-user specific storage area of the network). Specifically, in one embodiment, the digital content element is encoded using a compression-based codec, and consists of I-frames or I-slices, P-frames or P-slices, and B-frames or B-slices, and subsets of these elements are stored in the user-specific storage area. For instance, in one such case, a selected subset of I-frames or I-slices are extracted from the content element as a whole and stored (including reference or indexing data enabling reinsertion of the stored frames/slices) in the user-specific storage area, while the remainder of the components of the content element are stored in a common storage area. I-frames/slices are selected in this example based on their independence from other frames/slices (i.e., they can be coded without reference to other frames or slices, and are themselves used as references for other types of frames and slices such as P-frames/slices and B-frames/slices.

Upon receipt of a request for access to the content by an authorized user or device associated with the user-specific storage space, the user-specific I-frames/slices and reference data are accessed, as is the non-user specific or common portion. The components are then re-assembled via digital processing to reinsert the "missing" I-frames, and the content element delivered to the requesting device (whether via streaming, download, etc.). It will be appreciated that the constituency of the user-specific and/or common portions may be consistent across all users (e.g., each user has an effectively identical user-specific portion), or varied (such as where each user has a unique set of components that is determined by a randomization or other algorithm so as frustrate surreptitious access and re-assembly, and such unique portion is combined with a substantially identical or identical common portion based on knowledge of the selection algorithm(s)). See, e.g., U.S. patent application Ser. No. 15/170,787 filed Jun. 1, 2016 and entitled "CLOUD-BASED DIGITAL CONTENT RECORDER APPARATUS AND METHODS" previously referenced herein, for exemplary schemes for creation of unique and semi-unique content elements and streams. In this fashion, both the (i) control of access to the copyrighted material to only a limited number of users, or a single user/account; and (ii) network or "cloud" storage efficiencies from not having to individually store multiple complete copies for each user in their designated storage area, are achieved.

It will also be appreciated that the techniques described herein may be used consistent with other secondary content (e.g., advertising) selection and insertion approaches. For example, in one embodiment, a VAST (Video Ad Serving Template)-based approach is used for, inter alia, specifying advertisements including selection and associated rendering data. As is known, VAST is a common approach for structuring advertising tags that enables consistent and controlled serving of ads to e.g., video player applications on user devices. VAST uses an XML-based schema to transfer metadata relating to an advertisement from the advertisement server to the video player application. Specifically, an advertisement tag comprises standardized code associated with a site (or media player app) which tells the advertisement server what type of advertisement to be displayed based on, e.g., targeting or other criteria. The tag is sent to the advertisement server as part of a request, and the cognizant advertisement server returns a response including for example: (i) which ad(s) to play; (ii) how the ad(s) should be presented; (iii) advertisement duration; (iv) whether a given advertisement can be skipped; (v) click-through URLs; and so forth.

The complementary Video Player-Ad Interface Definition (VPAID) is a mechanism by which viewer interactivity opportunities can be provided, and interaction and other metrics can be assessed. Using VPAID, advertisers can determine how effective a given advertisement is, and adjust its presentation to optimize its effect (e.g., where it is delivered).

Mobile Rich Media Ad Interface Definitions (MRAID) is another such standard, targeted at mobile device apps (which may be numerous on any given mobile device, and not necessarily consistent). An MRAID API is used to provide developers access to in-app advertising control similar to VPAID.

Hence, depending on the client platform (e.g., DSTB, mobile IP-enabled device, etc.), one or more of the foregoing mechanisms can be used to control advertisement selection and rendering within the rendering application program, based on the methodologies described below. For instance, advertising "state" information for a given date and time can be referenced to or contained within VAST/VPAID data fields or similarly SCTE 130-6 data fields. Such "state" information will then be a part of any advertisement placement request that can be acted upon by the Ad decision system.

Methods—

Figure 3:
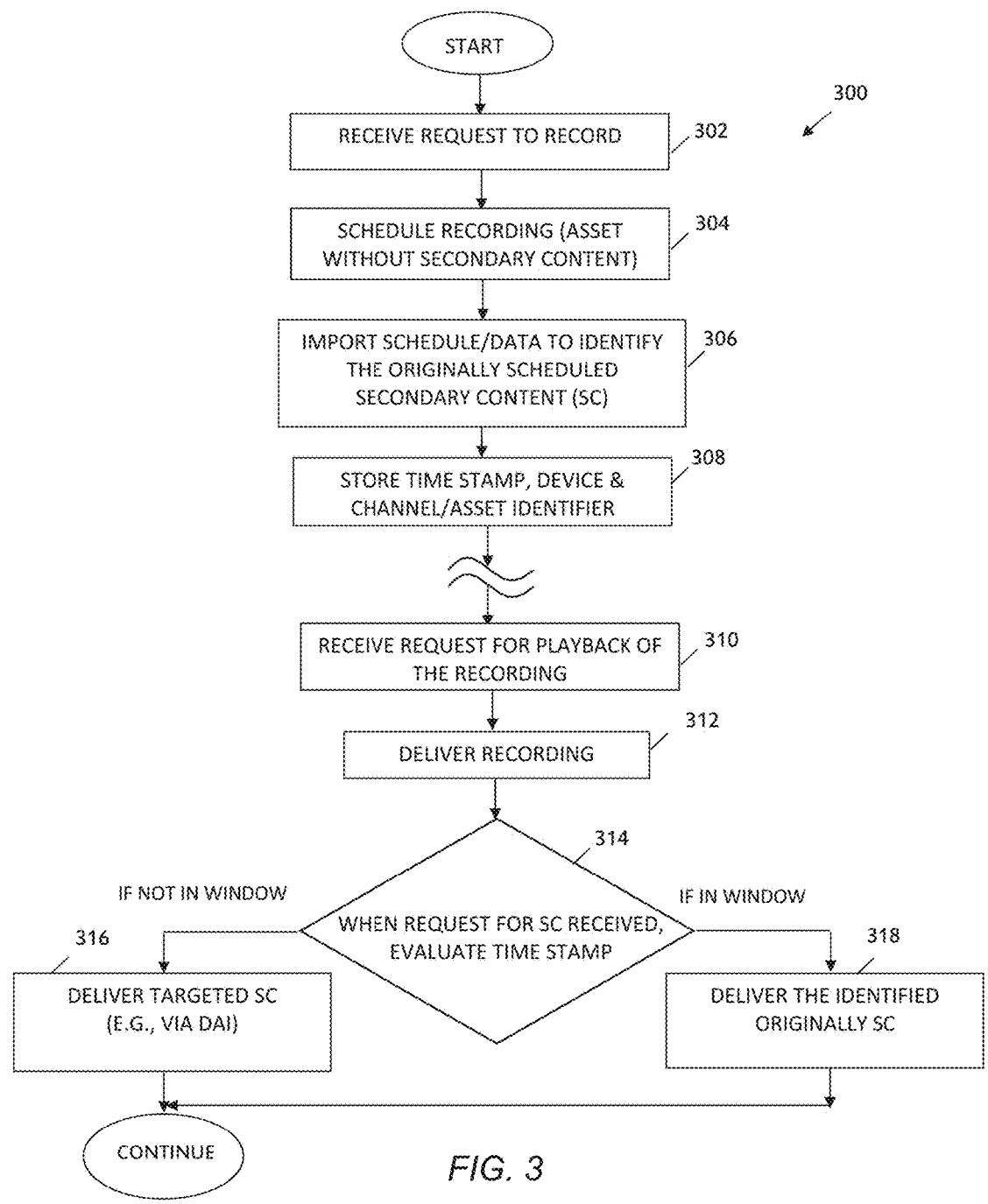
FIG. 3 is a logical flow diagram illustrating one exemplary embodiment of a method for enabling time-based dynamic secondary content (e.g., advertisement) placement calling in accordance with the disclosure.

Referring now to FIG. 3, one embodiment of a generalized method 300 for recording and delivering content in accordance with the present disclosure is provided. In practical embodiments, some of these steps (or sub-steps within each step) may be implemented in parallel, on different hardware platforms or software environments, performed iteratively, deleted, and so forth.

In the first step (step 302) of the method 300, a request is received to record content. Prior to the request, the desired content may be made available for recording via a selected communication channel. This may be in response to a user request for the content instigated from a client, or may be as a result of action taken at the head-end or other network node (including a third party content server), such as where the delivery of content is conducted according to a predetermined schedule, such as e.g., linear content which is broadcast, or VOD or OTT content which is first made available for streaming.

At step 304, the "primary" content is recorded (without secondary content included). As discussed in more detail in FIG. 3A-1 through FIG. 3A-3, in one embodiment (and consistent with the disclosure of co-owned and co-pending U.S. patent application Ser. No. 15/170,787 filed Jun. 1, 2016 and entitled "CLOUD-BASED DIGITAL CONTENT RECORDER APPARATUS AND METHODS", previously incorporated herein by reference in its entirety), the content recorded may comprise one or more uncompressed individual assets. The content may be transferred onto a storage entity and stored in a user- or device-specific (e.g., CPE- or client-specific) storage location. This recording or transfer may take place during the receiving process; e.g., where the received data is stored and then immediately recorded onto the storage in a continuous fashion. In some embodiments, clients or households have the ability to select different start and end times for the recording and thus, not all segments of the asset may be recorded for all users.

Per step 306, the CCMS schedule files and other transfer files (e.g., metadata) are obtained to identify the secondary content scheduled at the time of recordation or storage. In one embodiment, the CCMS schedule files are imported into the ADM 220, ADS 222, or any other DAI management or decision making entity consistent with the present discloses. That entity then identifies the originally scheduled secondary content (e.g., the advertisement(s) scheduled at the time of the original air date, the advertisement(s) scheduled at the time of recordation or storage, or the advertisement(s) at the time/date the recordation or storage is requested by the client). Stored data can be data indicative of actual ads (CID), or indirect data (e.g., parameters that are an input to a dynamic selection process that would ostensibly produce the same result as if entered at time of recording).

Figures 1, 3A:
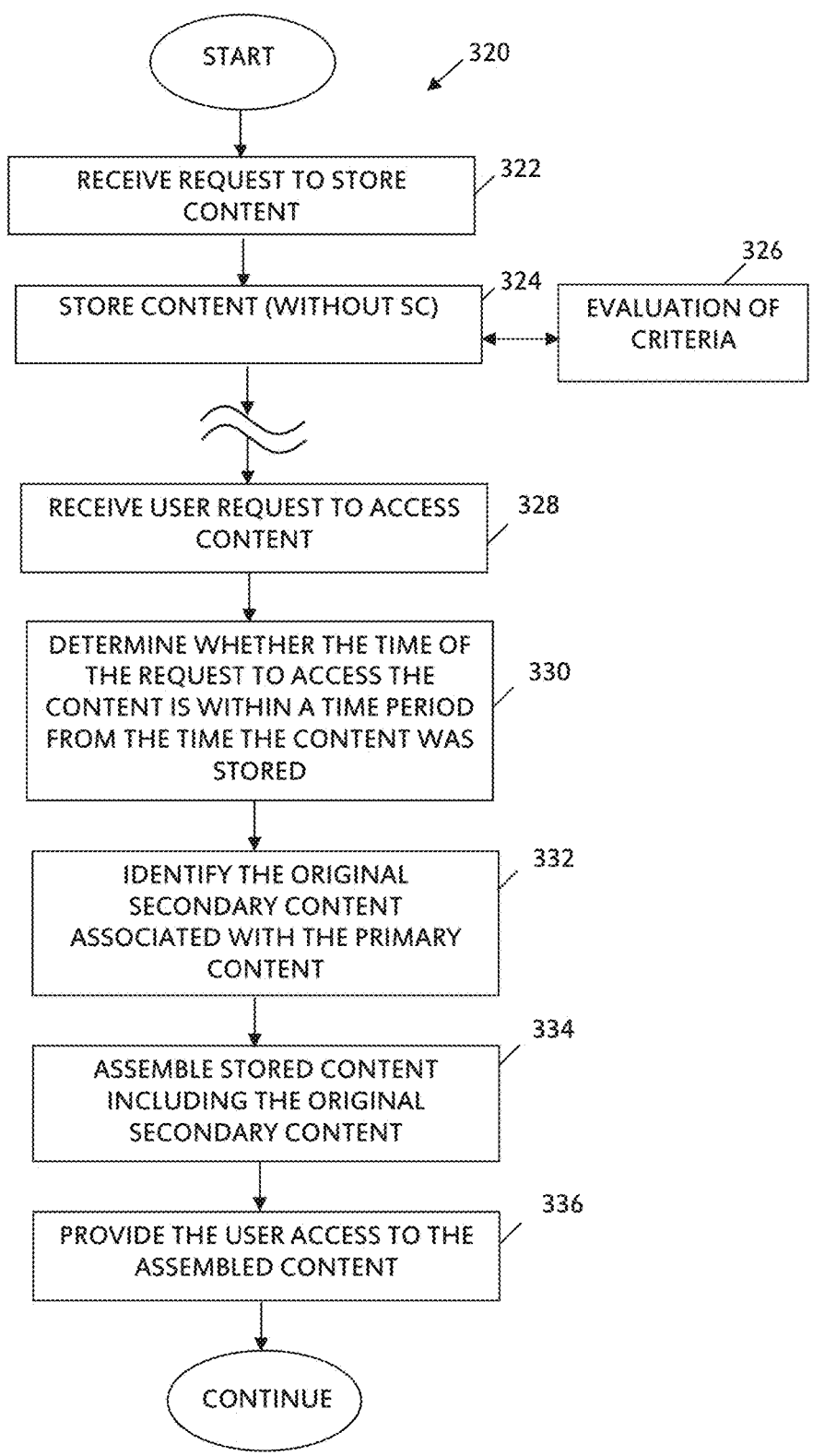
Figures 2, 3A:
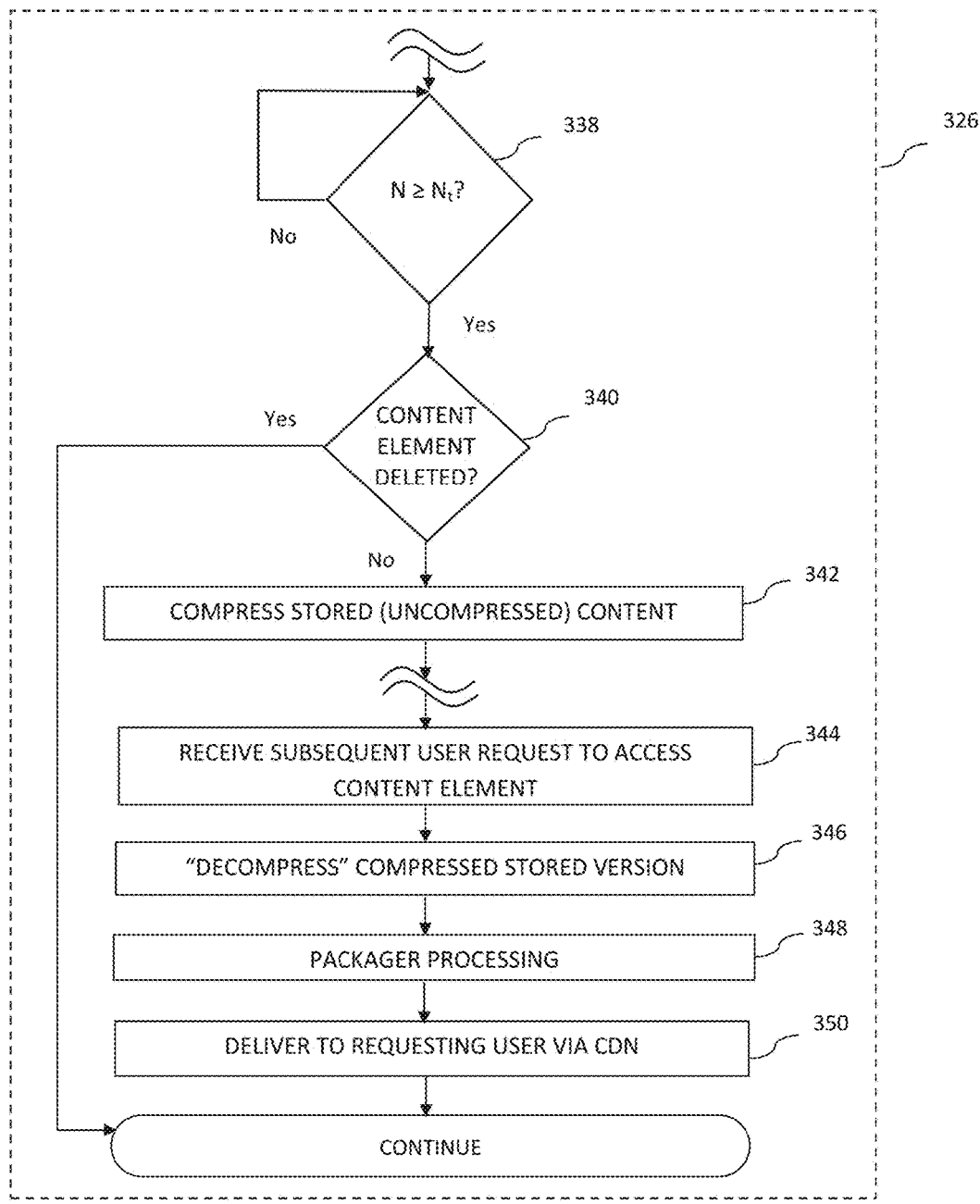
Figures 3, 3A:
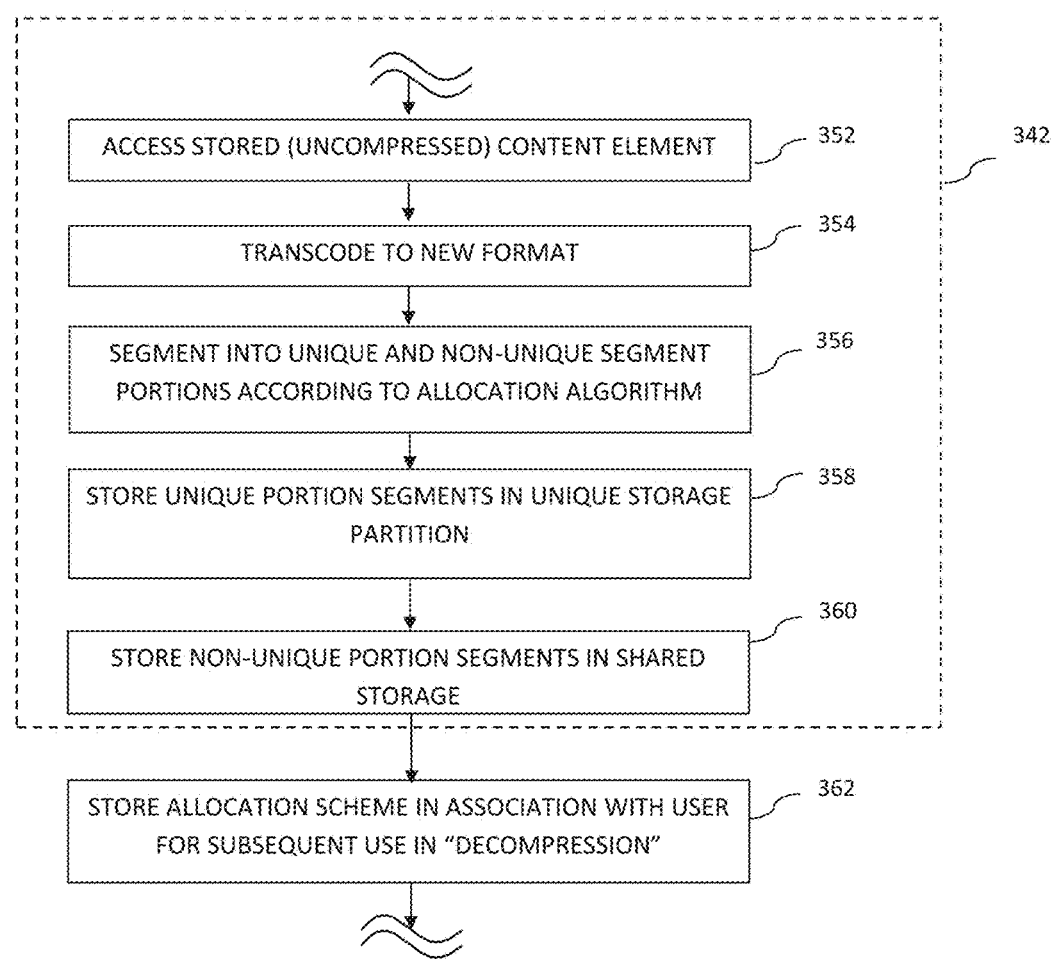
Figures 1, 3B:
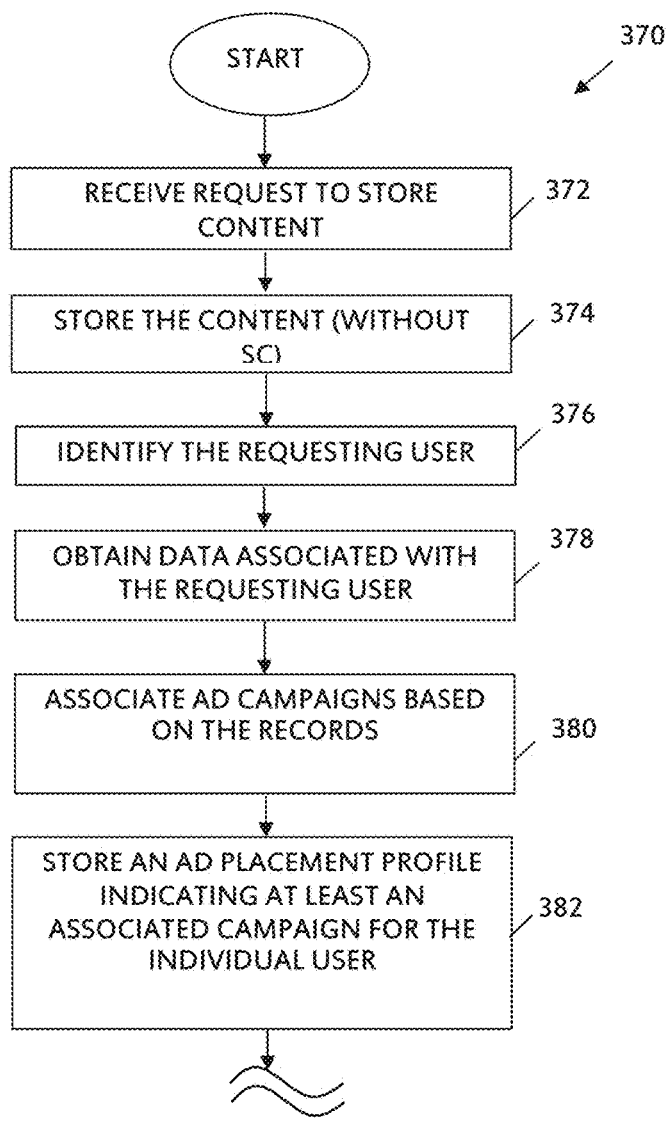
Figures 2, 3B:
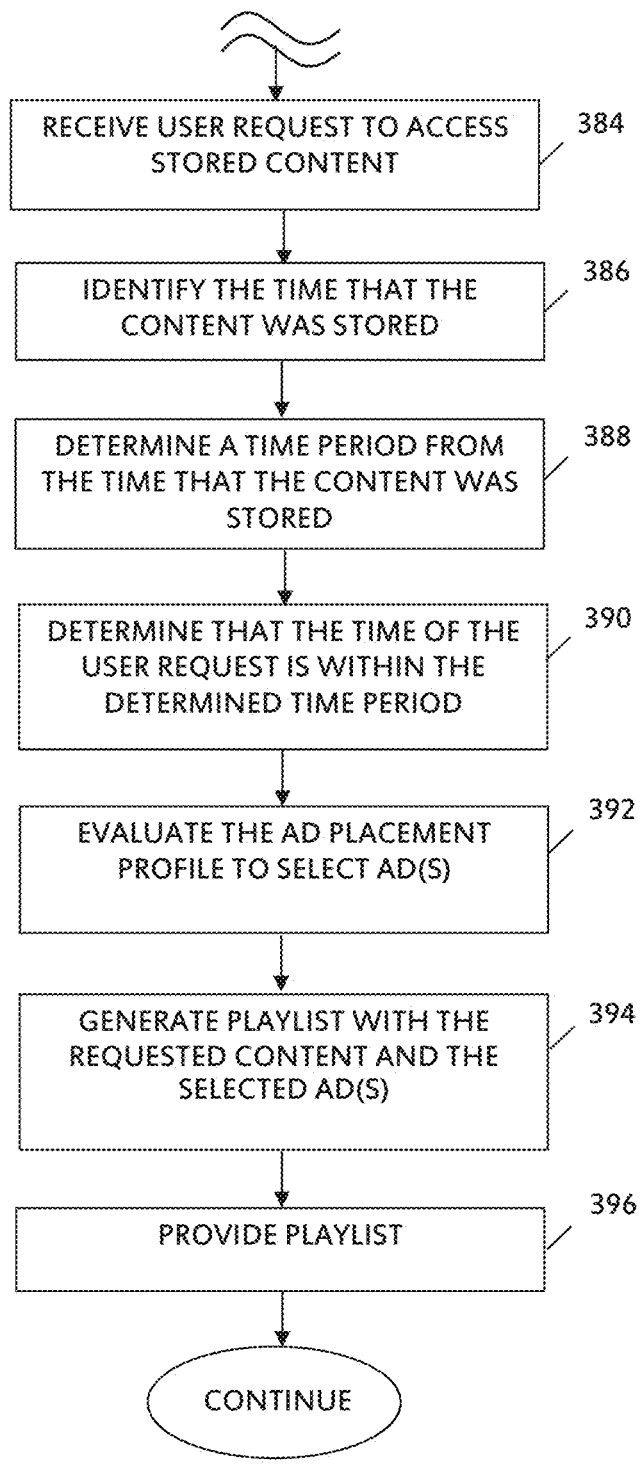

As discussed in more detail in FIG. 3b-1, in one embodiment, the schedules files and/or originally scheduled secondary content can be used in conjunction with one or more records (e.g., historic records associated with individual users, households, etc.) or user profiles/demographic data in order to associate the campaign of the originally scheduled secondary content to one or more other campaigns.

Next, a time stamp (e.g., of the time and date) of the recording is stored (step 308), along device (e.g., DSTB or other CPE) identifier data, and channel/asset identifier data. However, in other embodiments, the time stamp of the recording does not need to be stored. In such embodiments, the advertising server (e.g., the ADS 222, ADM 220, and/or any other management entity consistent with the present disclosure) may identify, at the time the user requests playback of the recording or shortly thereafter, the time and/or date that the recordation was effected (see, e.g., FIG. 3a-1).

In other embodiments, step 306 and/or step 308 may be performed when the call to the advertising server is made (i.e., when the client requests the secondary content at step 314).

Per step 310, the request for playback of the recording is received and the recording (i.e., the primary content) is delivered per step 312. In one implementation, the incoming programming content (e.g., from a content network or source) includes inserted SCTE-35 cues. In another exemplary scenario, the extant content channels (and the SCTE 35 or other cues present therein) are replaced by a customized linear addressable cue as described in co-owned, co-pending U.S. patent application Ser. No. 15/347,665 filed Nov. 9, 2016 and entitled "APPARATUS AND METHODS FOR SELECTIVE SECONDARY CONTENT INSERTION IN A DIGITAL NETWORK", incorporated herein by reference in its entirety. As described therein, the "linear addressable" encoded SCTE-35 cue is mixed into the transport stream (TS) stream via a splicer (with a different PID; e.g., hexadecimal 0x86), so that the client application/decision engine on the relevant client devices can access the stream designated by that PID (i.e., the targeted or time-based advertisement) in advance of the beginning of the advertising spot, so as to render a substantially seamless transition for the client device user. During playback of the recording (i.e., primary content or entertainment asset), once the SCTE-35 message is triggered, a call to the advertising server is made, thereby requesting the secondary content. In one embodiment, if a user trick-modes across the break boundary (thereby triggering the SCTE-35 message to the advertising server (e.g., ADM 220 and ADS 222) and subsequent operations), the logic is optionally configured in one embodiment to suspend the trick mode functionality and invoke the secondary content switch as previously described, such that the user is precluded from "getting a running start" and avoiding the secondary content. Likewise, if the user backs up over a boundary of the advertisement break, logic within headed can preclude the signaling and insertion of the same content if it has already been watched once by the user.

Once the call is made dynamically to the advertising server (e.g., the ADS 222, ADM 220, and/or any other management entity consistent with the present disclosure) at step 314, the advertising server determines whether the request for playback of the recording or stored content is within a certain time period from the time that the recording was scheduled or the content was stored (and also optionally evaluates other data associated with the stored time stamp such as device or asset identifier(s) as needed). In one exemplary embodiment, the stored time stamp of the recording is used in the determination. In another embodiment, the certain time period may be predetermined (e.g., 3 days or 7 days from original broadcast). In yet another embodiment, the time period may be determined "on the spot" based on at least in part on one or more business rules (including contractual agreements with the advertisers).

Per step 316, if the advertising server determines that the request for playback is outside the certain time period, the secondary content may be placed or inserted according to any known technique in the arts. In one embodiment, targeting specific users or groups of users that are likely to be most receptive to the commercial message embodied in the advertisements is employed. The aforementioned selective "targeting" and delivery of content to e.g., subscribers in a cable or other MSO-based network is generally well known in the prior art. For example, it may be desirable to include certain types of advertising at specific demographic or geographic segments of an MSO's subscriber base. One way of targeting viewers involves selecting advertisements based on a geographical region in which the advertisement is to be delivered; i.e., a so-called "advertisement zone", thereby providing certain advertising content to viewers in one local or regional area which is different than that provided to the viewers in a different local or regional area.

For example, the advertisements may be limited by the geographic area in which a business operates. Hence, it typically only makes financial sense for an advertisement for that business to be provided in geographical areas where the business is operated or provides services. Similar logic applies to the demographic, psychographic, and other planes; e.g., an advertisement for a super-high end sports car would likely be wasted when delivered to lower- or middle-class households or subscribers (which may or may not be correlated to geography), as would an advertisement for a feminine product delivered to a predominantly male audience. Additionally, the context of the primary content may not be compatible with particular types/themes of secondary content (e.g., a VOD movie having a non-violent theme might not mesh optimally with advertisements for UFC sporting or boxing events, regardless of demographics or geography).

Exemplary apparatus and methods for selection of secondary content to be inserted (e.g., via a "targeted" approach) are described in co-owned and co-pending U.S. patent application Ser. No. 11/186,452 filed on Jul. 20, 2005 and entitled "METHOD AND APPARATUS FOR BOUNDARY-BASED NETWORK OPERATION", co-owned and co-pending U.S. patent application Ser. No. 12/766,433 filed on Apr. 23, 2010 and entitled "APPARATUS AND METHODS FOR DYNAMIC SECONDARY CONTENT AND DATA INSERTION AND DELIVERY", as well as co-owned U.S. patent application Ser. No. 12/284,757 filed on Sep. 24, 2008, issued as U.S. Pat. No. 9,071,859 on Jun. 30, 2015, and entitled "METHODS AND APPARATUS FOR USER-BASED TARGETED CONTENT DELIVERY", each of which are incorporated herein by reference in their entirety, although other approaches may be used consistent with the present disclosure.

The, e.g., targeted secondary content is then delivered to the user per step 316.

Step 318 is the alternative to step 316, i.e., when the advertising server determines that the request for playback is within the certain time period. When that determination is made, the original secondary content (scheduled at e.g., the time of recordation or storage, the original air date, or when the recordation/storage was requested) that was identified (e.g., using the schedule files imported from the CCMS per step 206) is placed and delivered to the requesting user.

Now referring to FIG. 3a-1, another method 320 for time-based dynamic secondary content placement according to the present disclosure is provided. This embodiment is consistent with the disclosure of co-owned and co-pending U.S. patent application Ser. No. 15/170,787 filed Jun. 1, 2016 and entitled "CLOUD-BASED DIGITAL CONTENT RECORDER APPARATUS AND METHODS", previously incorporated herein by reference in its entirety.

In the first step (step 322) of the method 320, a request may be received to store content. As discussed elsewhere herein, prior to the request, the desired content may be made available for recording via a selected communication channel. This may be in response to a user request for the content instigated from a client, or may be as a result of action taken at the head-end or other network node (including a third party content server), such as where the delivery of content is conducted according to a predetermined schedule.

At step 324, the content is stored. In one embodiment, an uncompressed individual asset or content element is transferred onto the storage entity and stored in a user- or device-specific storage location. This recording or transfer may take place during the receiving process; e.g., where the received data is stored and then immediately recorded onto the storage in a continuous fashion. In some embodiments, clients or households have the ability to select different start and end times for the recording and thus, not all segments of the asset may be recorded for all users.

In one embodiment (and consistent with disclosure of co-owned and co-pending U.S. patent application Ser. No. 15/170,787 filed Jun. 1, 2016 and entitled "CLOUD-BASED DIGITAL CONTENT RECORDER APPARATUS AND METHODS", previously incorporated herein by reference in its entirety), one or more predetermined criteria (e.g., time since recordation, such as N=72 hours) is/are evaluated per step 326 (see FIG. 3a-2 for details); when the criterion/criteria is/are met, the presence of the stored uncompressed content element is optionally verified, and retrieved content element is then compressed per step 342 (see FIG. 3a-3 for details).

In one embodiment, the threshold criteria (e.g., period of time such as N=72 hours; see step 338) is determined by a network entity. The threshold period of time may be predetermined and constant across all users/households (i.e., macro-based threshold time duration, such as a time period when most devices or households are known via anecdotal or other data to request playback of at least a portion of content subsequent to requesting a recording of that content), applied to only subsets thereof, or even individualized to the particular household or client (e.g., a micro-based threshold time duration, such as based on a user's prior historical recording activity).

In one variant, if the determined threshold time period has not been reached per step 338, the uncompressed asset remains in storage until either a request to access the content is received, the threshold time period is reached, or the asset is purged from the system.

It is contemplated that the aforementioned compression and segmentation may occur concurrently, or the compression may occur before the segmentation. It is further appreciated that the compression and/or segmenting processes may comprise one or more software applications run on a processor, or on a separate headend or non-headend entity, or on the digital processor of any of the aforementioned headend entities.

Referring back to FIG. 3*a*-1, per step 328, upon receipt of a user request for access to the stored/recoded content element, a request is sent to the components at the headend that support dynamic secondary content insertion (e.g., CM 224, ADM 220 and ADS 222). If no time stamp has been stored, one or more entities of the advertising server (e.g., ADM 220 and ADS 222) may determine when the recordation was requested and subsequently make the determination whether the request is within the time period (step 330). The foregoing time period may be predefined, determined when the user requests access to the content, or determined when the call is made to the advertising server. The time period is typically based on business rules (e.g., prescribed measurement obligations for ratings, contractual agreements with the advertisers, etc.); however, other criteria may affect the time period (such as based on a user's prior historical recording activity).

When the advertising server determines the request to access the content is within the predefined time period, per step 332, the advertising server will identify the original secondary content that was scheduled at the time the content was stored (or at the time the content was requested to be stored). As explained elsewhere herein, the advertising server, in one embodiment, may identify the originally scheduled secondary content by importing the CCMS schedule files.

At step 334, a presentation stream is assembled by combining primary content and secondary content assets (also referred to as "entertainment content assets (EC)" and "advertisement content assets (AC)", respectively). The presentation stream is then delivered back to the CPE 106, client 800 and/or PMD 107, where it plays out as an uninterrupted session (step 336).

In one embodiment shown in FIG. 3*a*-2, upon receipt of a user request for access to the recoded content element (step 344), the (virtually) compressed stored element is "decompressed" (i.e., the constituent unique and shared components identified) per step 346, including any requisite supporting processing to generate e.g., the manifest file associated with the content element (step 348) to enable delivery via the content distribution network to the requesting user device (step 350).

In the exemplary embodiment, a packager process (not shown) generates a manifest file associated with the recorded content. Specifically, the manifest file is a data structure comprising a listing of addresses for each of the media segments of a stream of data, and includes information about the media segments such as bitrates, closed captioning, audio, etc. Different ABR models may use different manifest files. For example, with HTTP Smooth Streaming (HSS), each of the components (closed captioning, audio, etc.) are in separate files with addresses for each in the manifest file. With HTTP Live Streaming (HLS), audio is embedded in the segments and thus are not separately listed in the manifest file.

In another embodiment, the manifest file includes metadata, and a listing of media segment entries. Metadata refers to information used by a client device to interpret or otherwise manage the media segments (metadata is also colloquially referred to as "data regarding data" or "data relating to data"). Common examples of metadata include e.g., version information, protocol, file formats, supported codecs, resolution, encryption, temporal information (transmission time, time of presentation, time stamps, etc.), geographic information (restricted locations, locations for presentation, etc.), content type indicia, synchronization information, control data, etc. Stated differently, the metadata describes the media segments and can be used as a reference file when assessing or otherwise making use of the media segments.

In one implementation, the list of media segment entries in the manifest file comprises a list of network addresses (which may be remote or local) where the corresponding segments of media content may be accessed and/or downloaded. For instance, each of the media segment entries may be listed by a Uniform Resource Locator (URL). In some embodiments, the entries may be in computing resource "path" format. Computing paths may be either absolute (i.e., the path provides the fully elaborated and unique location of the segment in a file structure) or relative (i.e., the path provides a relative location of the segment in a file structure). Additionally, in some embodiments, the entries may be in symbolic format, such that at least a portion of the entry must be further interpreted (i.e., is not human-readable). Common examples of this may include e.g., HyperText Markup Language (HTML) tags, proprietary tags, Java, Javascript, etc. Moreover, some implementations may substitute or intermingle any of the foregoing techniques to flexibly accommodate various operational models.

As previously noted, secondary content may be inserted into any type of on-demand or on-demand-like programming. For example, secondary content may be inserted according to the present invention into video on-demand (VOD), free on-demand (FOD), subscription video on-demand (SVOD), movies on-demand (MOD), start-over, lookback etc.

Lastly, per step 350, the VOD asset having one or more secondary content elements (e.g., targeted or time-based advertisements depending on whether the content is requested within the certain time period, e.g., from the original air date of the content or from the time the content was recorded/stored) disposed therein is streamed to the client.

In the exemplary embodiment, each media segment is an encoded and encrypted subsection or segment of media content. The media segments, when decrypted, decoded, and played in the appropriate order, render the original media content. In one implementation, each media segment represents a portion of video associated with a specific resolution, codec, and time stamp. The media segments are assembled according to a time stamp sequence.

FIG. 3*a*-3 shows one exemplary embodiment of the methodology of compression per step 342 of FIG. 3*a*-2.

Specifically, in the illustrated embodiment, the uncompressed (and unique) content element is first accessed from "unique" storage (i.e., storage device) per step 352.

Next, per step 354, in one embodiment, the content is optionally transcoded to another format (e.g., "encoding compressed" such as from MPEG-2 to MPEG-4 AVC) before delivery. In accordance with disclosure of co-owned and co-pending U.S. patent application Ser. No. 15/170,787 filed Jun. 1, 2016 and entitled "CLOUD-BASED DIGITAL CONTENT RECORDER APPARATUS AND METHODS", previously incorporated herein by reference in its entirety, the segmentation or allocation algorithm may be used to segment the content element into at least two portions; i.e., the unique portion, and the complementary portion (step 356). The segmenting process generally functions to segment the content at I-frames according to a schedule. In a further embodiment, the segmentation process comprises identifying or generating various sequences of "shared" segments, i.e., numeric complements, which may be shared by multiple ones of the devices or households 204. The numeric complements may be of any sequence (e.g., even, odd, triplets (i.e., three sequential segments), Fibonacci series, etc.).

A network entity (e.g., supervisory process such as e.g., one running on the cDVR server 206) assigns each household or client device with one or more numeric combinations or strategies of the complements (e.g., only even, or even and odd, etc.). In one embodiment, the assignment is random, but in a way that guarantees uniqueness for each stream delivered to the devices or households 106. This functionality is also provided by virtue of storage of two or more physically different but content-identical versions of the shared complement (e.g., all the "odds" for a client whose allocation scheme for the unique segments was "all evens"). Each of these physically different versions of the shared complement can be uniquely combined with a given user's unique (non-shared) stored segments or portion, thereby creating a significant degree of uniqueness (albeit with essentially no content-wise diversity), so as to inter alia maintain a high degree of orthogonality between combinations for individual users. Thus, the number of complements stored for each household or device 106 creates the uniqueness for each stream delivered to the devices or households 106. The more numeric complements that are used, the more uniqueness (and orthogonality) can be created.

Next, per step 358, the unique portion (i.e., a plurality of segments or chunks of video and/or audio data selected based on the particular scheme chosen for the user or their request) are stored in the relevant unique storage portion of the archival storage device (not shown), while the common or shared complementary portion is stored in shared storage (not shown), per step 360.

Lastly, per step 362, the allocation algorithm or scheme used to segment the content element, (e.g., even-numbered segments, odd-numbered segments, triplets, Fibonacci, etc.) is stored (in association with user- or client-specific data for identification) so as to permit a subsequent software process (e.g., the packager when assembling the manifest file, or even the client player application) to identify the scheme used so it can obtain a proper shared complement.

Now referring to FIG. 3b-1, method 370 is a logical flow diagram illustrating an exemplary generalized method for time-based dynamic secondary content placement using advertisement placement profiles, in accordance with one embodiment of the present disclosure. As shown, the method 370 includes first receiving a request to store content per step 372. The content is then stored in accordance with any of the embodiments described elsewhere herein.

Per step 376, the requesting user may be identified. In one embodiment, a client application may provide subscriber account information, device identification, etc. upstream in order for the ADS 222 (and other entities) to identify the subscriber. The subscriber may be anonymously identified using a cryptographic hash. Other information may be transmitted as well, e.g., MAC address, IP address, configuration data, etc. During operation of the CPE 106, a client application (510, 610) is run on the microprocessor. The client application (510, 610) may be configured to collect information regarding the user's actions with respect to content, e.g., previous secondary content displayed to the user (step 378). For example, the client application (510, 610) may record button presses, playback events, trick mode events, etc. and pass this information to the ADS 222 and other headend entities. The obtained data may be real-time or near-real time (such as is collected on an ongoing basis from the user/subscriber via their DSTB tuning, online, or other activities), or may be historical in nature, such as where the data is associated with a particular temporal period (e.g., last calendar month), or an event (e.g., during the NFL Super Bowl of the prior year).

In another embodiment, the information identifying the subscriber is correlated to data warehouse records (e.g., historic records associated with individual users, households, etc.), and the records are retrieved per step 378. The CM 224 may manage the advertisement campaigns in one embodiment and permits the control of advertisement selection by an operator associated with the MSO. Thus, it is via the CM 224 campaign management that the goals of the advertisers and/or the MSO are accomplished. The ADS 222 may obtain records of various campaigns that have had secondary content associated therewith and have been shown to individual users, households, zones, etc.

Per step 380, in one embodiment, the schedules files and/or originally scheduled secondary content can be used in conjunction with the obtained data or retrieved (historic) records in order to associate the campaign of the originally scheduled secondary content to one or more other time-based campaigns. In one embodiment, the time-based campaign association may be based at least in part on one or more business rules. Hence, the campaign association may be useful in varying advertising content prior to distributing a program to the CPE 106 (e.g., dynamically, in response to changing events or conditions), yet still preserving contractual obligations to advertisers or other entities. In one embodiment, the association may be made by the CM 224. The association may be included in a user profile or advertisement placement profile, which may be stored by any entity consistent with the present disclosure per step 382. The advertisement placement profile may also include: (i) a time stamp of the time/date that the recording was scheduled or the content stored, and/or (ii) the time period from the time that the content was stored/recorded to the time the contractual obligations with advertisers expire. The time period may be a prescribed period (e.g., 3 days) or may be dynamically determined (e.g., the time the content was recorded/stored plus "x" amount of time based on business rules). The advertisement placement profile may also include any other information that might be useful for the ADS 222 and/or ADM 220 in the decision making process described herein such as the advertisement zone associated with the user (as determined by e.g., zip code, area code, or other indicator assigned to a subscriber and/or device), and/or unique characteristics of the requesting subscriber (demographics, psychographics, firmographics, and/or behavioral variables).

As shown, per step 384, a request to access the stored content is received. In one embodiment, the request comprises a request for VOD content from a user terminal. The request may be received at the primary content server 206 via the AS 214.

The primary content server 206 may, in response to receiving the request, send a message to the ADM 220 thereby triggering the advertising server to identify the time that the content was stored (or that the user requested for the content to be stored) per step 386, determine a time period from the time the content was stored (which may be based on or more business rules) per step 388, and determine whether the time that the user requested to access the content was received with that time period per step 390. However, in one embodiment, if the time that the content was stored (or that the user requested for the content to be stored) and the time period from the time the content was stored, were performed previously and/or included in the advertisement placement profile, steps 386 and 388 would be obviated. In another embodiment, the evaluation of the advertisement placement profile (step 392) may comprise the determination of whether the time that the user requested to access the content was received with the time period from the time the content was stored (step 390). The various business rules for this determination may include for example, whether secondary content is inserted/placed may be dependent on one or more factors relating to the primary content, the subscriber, the type of delivery requested, the requesting device, the user context, etc.

Per step 394, the entities charged with identifying secondary content (e.g., the ADM 220, ADS 222, and/or CM 224) perform the selection based on the evaluation of the advertisement placement profile. The secondary content may either be the secondary content as originally scheduled at the time the user requested to store the content or secondary content that is part of a campaign associated with the campaign of the originally scheduled content. Next, per step 394, a playlist of secondary content is created with the selected time-based secondary content.

The time-based secondary content may comprise for example advertisements, which are inserted at the beginning of the primary content. If it is determined that secondary content should be inserted at the beginning of play out of the requested content, at least one of the secondary content assets from the playlist is added ahead of the beginning of the primary content and, per step 396, the secondary and primary content are provided to the requesting user (the secondary content being inserted so as to play out prior to play out of the primary content).

A pause or a stop command may also be embedded within the primary content, such as at the end of the content or elsewhere therein (e.g., for a preprogrammed intermission). Hence, when the embedded command is reached, a signal is automatically generated and sent to the dynamic secondary content insertion application (e.g., running on one or more of the management entities 220, 222, 224, 210, 212). When the pause or stop command is received, the dynamic secondary content insertion application determines whether secondary content should be inserted.

It will also be recognized that the present invention may be used in conjunction with the error logging and reporting methods and apparatus described in co-owned U.S. patent application Ser. No. 10/722,206 entitled "Methods and Apparatus for Event Logging in an Information Network" filed Nov. 24, 2003, and issued as U.S. Pat. No. 7,266,726 on Sep. 4, 2007, which is incorporated herein by reference in its entirety. For example, the aforementioned disclosure describes methods and apparatus (including APIs) for logging errors that occur on client devices, PMD 107 or CPE 106. In the present context, these errors (which might relate to an error resulting from improper use of a codec, failure to properly authenticate or implement conditional access, failed encryption key(s), etc.) can then be transmitted upstream to a responsible entity (e.g., VOD or conditional access server).

In one embodiment, if the content is requested outside the time period described herein (whereby targeted, segment-based content delivery is permitted), yet there are errors in placing/inserting targeted secondary content of segment-based content delivery, the improved apparatus and methods of the present disclosure may be used to deliver the originally scheduled advertisements or advertisements from an associated campaign.

In another embodiment, a reporting method is disclosed which allows the MSO (e.g., studios, networks, advertisers, etc.) to utilize gap assessments of the accuracy of placed advertisements versus original placements. The ADM 220 and ADS 222 may cooperate to transmit secondary content to CPE 106 (discussed above) and simultaneously send metadata regarding the secondary content to a collecting entity 230 and report generating entity 228.

Figure 4:
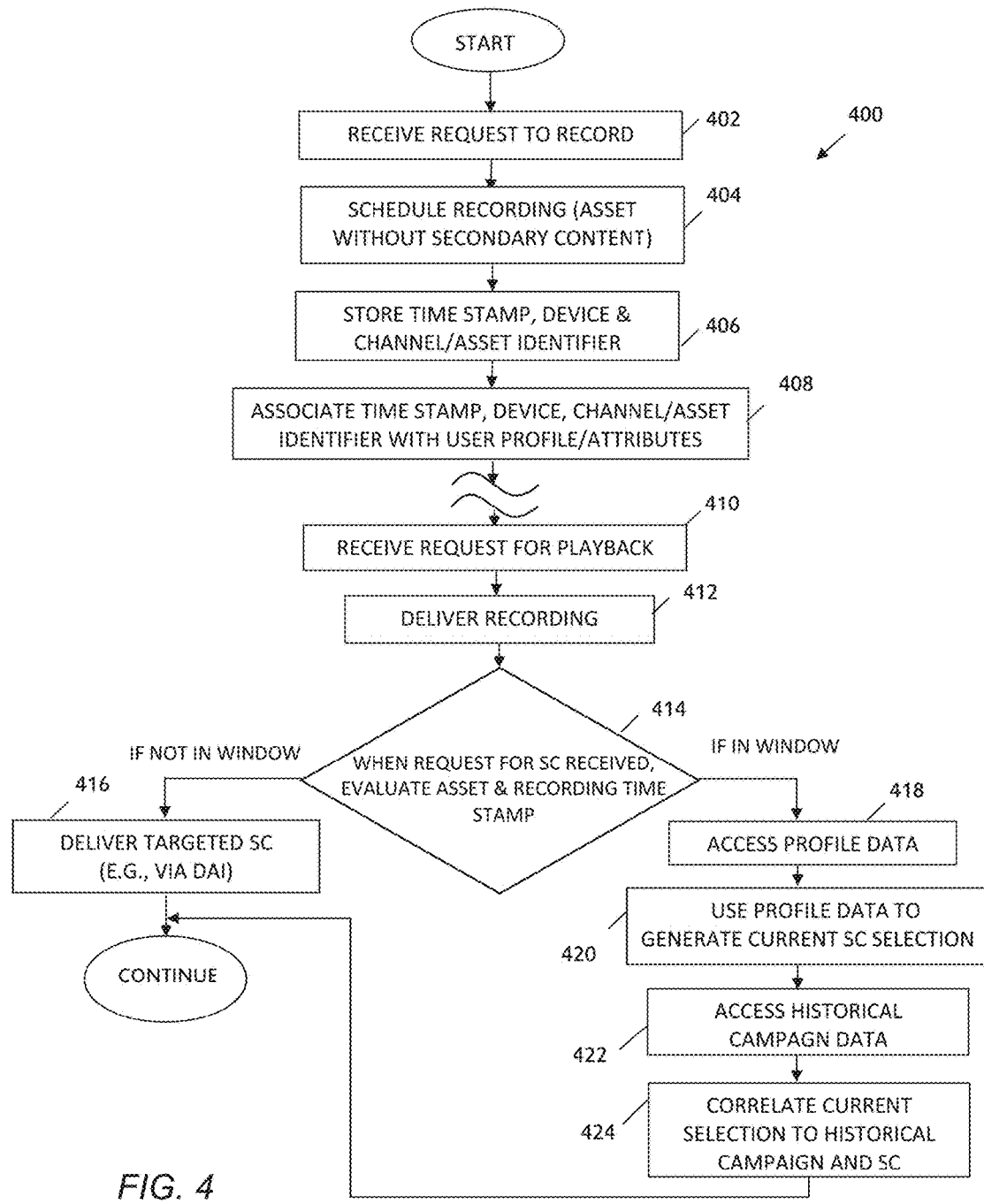
FIG. 4 is a logical flow diagram illustrating another exemplary embodiment of a method for enabling time-based secondary content placement calling in accordance with the disclosure.

Referring now to FIG. 4, another embodiment of the method for time-based secondary content placement is disclosed. This approach, in contrast to the method 300 of FIG. 3, obviates the determination of the originally scheduled secondary content at time of recording (step 306) in favor of a post-access (or contemporaneous) analysis of prevailing secondary content selections, and correlation to prior campaigns then-pending at time of recordation.

In this embodiment, the method 400 comprises first receiving a request to record the programming or other primary content (step 402). The recording is next scheduled at step 404, and a time stamp or other temporal reference generated (step 406), as well as device identifier and channel/asset identifier(s).

Per step 408, the recorded time stamp, device identifier data, and channel or asset identifier data are evaluated and associated with user profiles or other user attributes, such as those stored in a subscriber database. For instance, in one implementation, the requesting device (e.g., subscriber's DSTB) is identified via IP, MAC address, or other data (e.g., from the request), and the user profile or attribute data associated with the subscriber's account to which the device is registered is accessed and associated with the recording. Subscriber Information Systems & Applications used for $1^{st}$ and $3^{rd}$ party audience targeting would in the exemplary case include the recorded content and advertisement state identifiers for later retrieval by the Ad decision system, this information is considered a "Ad state" addition to an otherwise stateless subscriber information system.

Subsequently, a request for playback or access to the recorded content is received from a client 800, CPE 106 or PMD 107 (step 410), and the recorded content delivered per step 412 (e.g., streamed, delivered as "chunks" with a manifest, as one bulk file delivery, or otherwise) to the requesting device.

Per step 414, when a secondary content insertion point within the content is reached (as indicated by e.g., an embedded cue or other data within the primary content or manifest), the recordation time stamp from step 406 (here, stored on the network-side) is evaluated against the current time/date. If within the prescribed window (e.g., C3 or C7), the profile associated with the user (or household) associated with the requesting CPE/client/PMD, or with the device itself (such as based on MAC address) is accessed per step 418, and that data is used to generate a current secondary content selection, such as via submission of a request to an advertisement decision service to DAI process (step 420). Notably, the current selection is predicated on then-pending campaigns, which may or may not be the same as those in effect at the time of recordation. Next, per step 422, the historical data regarding which campaigns were in effect at the time of the recordation (as determined by the time stamp) are determined, such as via access to data by the campaign manager entity 224 of FIG. 2. Such campaign data further includes data indicative of particular advertisements within each campaign, which is used in step 424 to correlate the current selection(s) from step 420 to analogs within the prior campaign(s). So, for example, in one implementation, a prior campaign may have data indicative of advertisements for the sporting equipment or package subscriptions. The corresponding current selections (per step 420) may be for upcoming baseball games (which were selected on the basis of their applicability to the requesting user based on e.g., significant average consumption of sporting events indicated in their profile data). Hence, the comparison algorithm employed by the RM 223 may identify the sporting equipment or subscription ads within the prior (but now expired) campaign as being relevant to the user's recorded content based on data relating to the theme or description of the prior ads indicating a sports context, and access them as if the primary content recording were being watched at its original date and time of broadcast.

Per step 416, if the time stamp is not within the prescribed temporal window (e.g., C3 or C7), then a targeted dynamic advertisement insertion (DAI) process is utilized to pick "fresh" ads for the user based on currently prevailing campaigns, etc.

It will also be appreciated that while the association of step 408 of FIG. 4 is shown as being performed before the request for playback (step 410), such association(s) may be performed after the request for delivery of the recorded content is received as well.

FIG. 5 illustrates another exemplary embodiment of the method for time-based secondary content placement is disclosed. This approach, in contrast to the method 300 of FIG. 3, obviates the determination of the originally scheduled secondary content at time of recording (step 306) in favor of (i) storage of context data indicative of a requesting user context, coupled with (ii) a post-access analysis of prevailing secondary content selections, so as to generate closely correlated "replacements" for ads within prior campaigns then-pending at time of recordation. Moreover, unlike the method 400 of FIG. 4, the advertisement selections generated by the method 500 of FIG. 5 are not intended to be identical (or practically identical) to selections that would have been made at the time of original recording (although they may be), but rather are intended to be merely similar, and are based on a prevailing user context as opposed to advertisement campaigns that were in effect at time of recordation. Such selections may also differ from those selected by the DAI process per step 516 (i.e., if the time stamp indicates that the current time is "out of window"), in that the former is based on then-prevailing user context, while the latter is based on currently prevailing context or other factors.

In this embodiment, the method 500 comprises first receiving a request to record the programming or other primary content (step 502). The recording is next scheduled at step 504, and a time stamp or other temporal reference generated and stored, along with device identifier data and asset/channel data as applicable (step 508). Additionally, per step 506, historical context data is stored. In one implementation, such historical context data comprises data relating to a user and/or user device context at the time of recordation, in effect attempting to describe the general user/client device situation in which the content recordation request was issued. This may include for example historical data regarding a user's viewing/channel change activity immediately before the recording request was issued, user location or "state" information (e.g., at work, at home, going to sleep, etc.), rendering client device parameters (e.g., screen brightness dimmed, indicating dark environment, reduced audio volume, open apps indicating e.g., social media interaction, etc.), or other types of information useful in characterizing the user's location and "frame of mind" at the time the recording was requested.

As a brief aside, modern personal electronics are also increasingly equipped with a variety of sensors, as well as access to "artificial intelligence (AI)" such as could-based personal assistant functions (e.g., Google Now™). Sensors may include for example accelerometers, position location devices (e.g., GPS or GLONASS receivers, or location detection via e.g., LTE/LTE-A base station or Wi-Fi AP association), temperature and pressure sensors, altimeters, biometric sensors, acoustic sensors, and yet others. Such sensors and AI functionality can be increasingly leveraged to determine user-specific context or state. Accordingly, embodiments of the present disclosure make use of data generated by such apparatus (whether in raw form, or having been pre-processed) to help guide state or context determinations.

Similarly, a user's status notification via the assistant (or even social media applications) can be used by the context determination algorithms as inputs. For example, if the user updates their assistant or social media account for "in bed", this information may be used by the context determination algorithms to configure or guide the secondary content selection algorithm(s).

For one example of the foregoing, a user may be lying in bed, watching their tablet in a darkened room, and decide to record a program they wish to see rather than viewing it contemporaneously. State or context data indicative of low volume, dimmed display, GPS- or Wi-Fi-based location data indicating that they are at home in their bedroom, and time-of-day information indicating that it is then late at night, would all indicate that the user is likely in bed and ready to go to sleep. Hence, advertisements applicable to nighttime or pre-sleep environment would be applicable at time of recordation. When the user later wishes to watch the recorded program (e.g., the next night when in bed, but not so sleepy), the advertising context will generate advertisement selections that were applicable in the same context the night before (assuming the access request is within the prescribed temporal window).

Notably, the foregoing contextual or state approach can also be used irrespective of the temporal window, e.g., as part of the DAI per step 518, if desired. In such cases, the context or state information is not necessarily about preserving a C3/C7-based measurement or contractual obligation, but rather recreating a user context around which appropriate advertising is selected.

Per step 510, the time stamp, device identifier data, and asset or channel identifier data is also associated with user profile data or attribute data, as previously described herein. Similar to FIG. 4, such association per step 510 can also be performed post-request.

Returning to FIG. 5, a request for playback or access to the recorded content is subsequently received from a client 800, CPE 106 or PMD 107 (step 512), and the recorded content delivered per step 514 (e.g., streamed, delivered as "chunks" with a manifest, as one bulk file delivery, or otherwise) to the requesting device.

Per step 516, when a secondary content insertion point within the content is reached (as indicated by e.g., an embedded cue or other data within the primary content or manifest), the recordation time stamp from step 506 (here, stored on the network-side) is evaluated against the current time/date. If within the prescribed window (e.g., C3 or C7), the historical context data referenced above is used to identify and deliver appropriate ads based thereon (step 520).

Figure 5A:
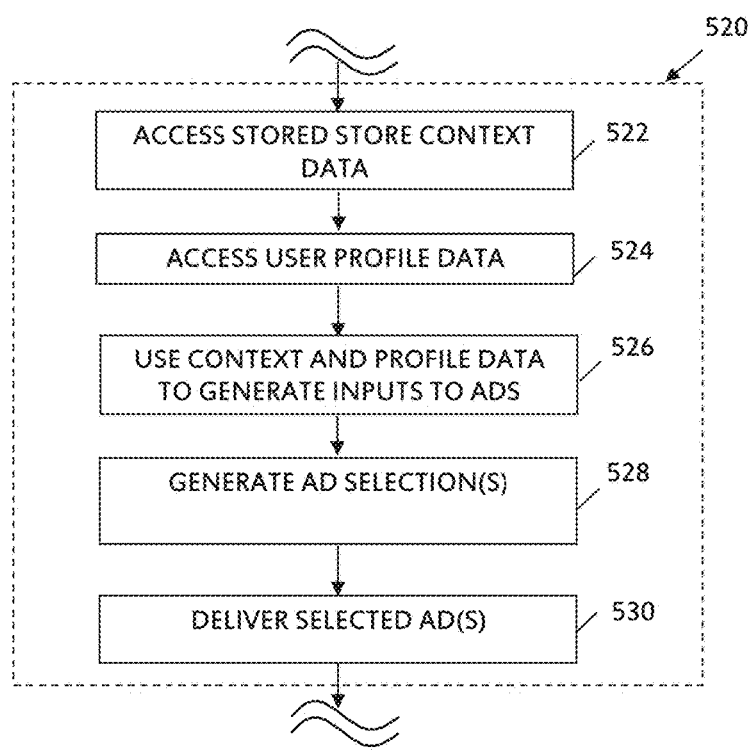
FIG. 5a illustrates an exemplary implementation of step 518 of the method 500 of FIG. 5.

FIG. 5a illustrates one implementation of the methodology of step 520. Specifically, per step 522, the stored context data from step 506 is accessed, and the user/client device profile data is accessed per step 524. These two data sources are utilized in step 526 to generate input data for the advertisement decision service or DAI process, which generates advertisement selections based thereon (step 528). These selected ads are then delivered to the user per step 530, such as via URLs in a schedule or manifest which the user client device 800 can access at the insertion points, or even in-line with the delivery of the recorded content (such as via the CPE 106).

Recording Manager—

Figure 6:
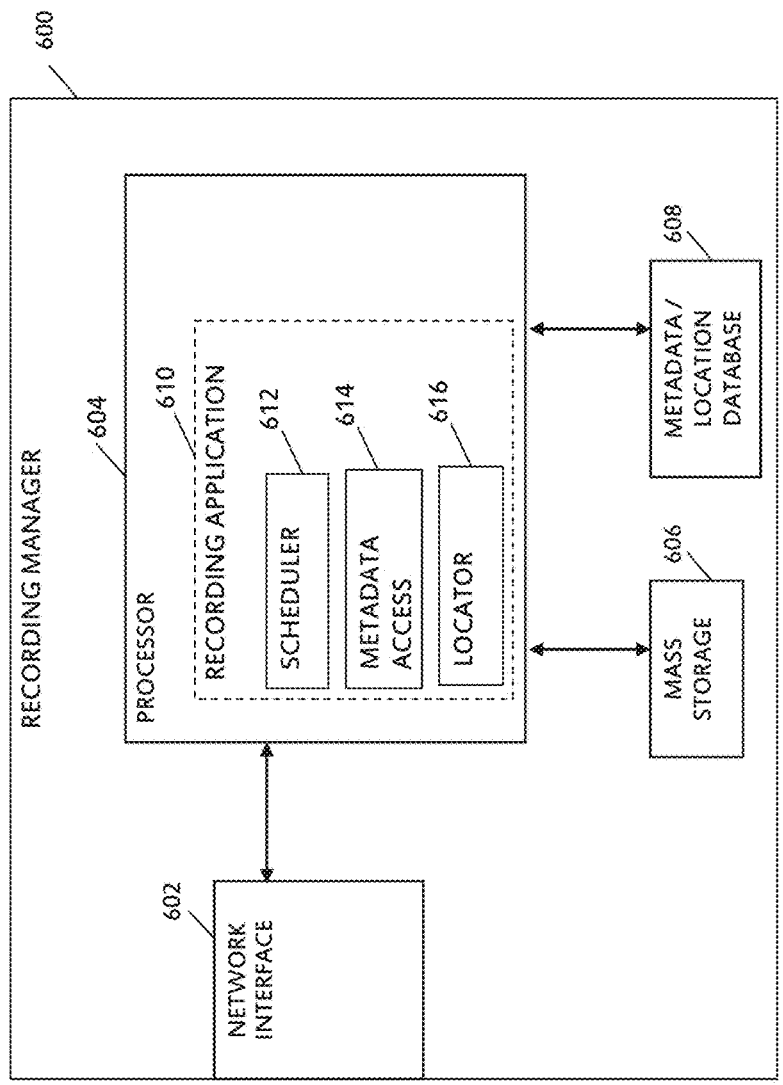
FIG. 6 is a functional block diagram of one exemplary embodiment of a recording manager apparatus for use with the present disclosure.

Referring now to FIG. 6, one embodiment of the recording manager (RM) apparatus 223 adapted to manage recording, access, and delivery of packetized content is illustrated. It will be appreciated that while described with regard to FIG. 6 as a discrete device, the recording manager functionality may be partly or wholly integrated with one or more other components of the architecture 200 of FIG. 2, including for example the ADM 220 and/or ADS 222, or the AS 214.

As shown, the recording manager 223 generally comprises a network interface 602, digital processor(s) 604, a mass storage device 608, and a metadata/location database 608, although it will be appreciated that the recording manager functionality may conceivably be rendered entirely in software, such as via an application running on an extant hardware environment, or yet other form factor.

The processor 604 is configured to run a recording application 610 thereon for enabling the disclosed secondary content management functionality. The recording application 610 is comprised of various constituent application sub-programs or routines, including at least a scheduler application 612, a locator application 616, and a metadata access application 616. The metadata access application 614 enables the recording manager 223 to access metadata within the requests to record, requests to access, and playback modification requests received at the recording manager 223 from the receiver/decoder device 700 and/or mobile device 800 (each described below). The metadata includes information identifying the subscriber and/or device as well as information identifying the requested content.

Metadata identifying the subscriber and/or device can be used to: (i) authenticate the user as a subscriber to the MSO, (ii) determine whether the requesting device is within or associated to a home network or other premises serviced by the MSO, and/or (iii) determine whether the subscriber's service level (subscription level) permits or entitles viewing of the requested content). In one embodiment, the foregoing occur when the recording application 610 transmits the metadata to an extant managed network entity, such as a billing server or subscription management process. Alternatively, the recording application 610 may compare the metadata to stored information and/or query a managed network database of information to determine the foregoing entitlements/authentications.

Metadata identifying the content is used by the scheduler application 612 of the RM 223 to cause the content to be stored at a storage entity at the given date/time. In other words, the scheduler application 612 of the exemplary embodiment includes the necessary timers and commands to "awaken" at the particular date/time and cause the storage devices (which it is in communication with, such as an nPVR process) to record the content.

The locator application 616 enables the determination of a network location of requested content at a storage entity. For example, when a request for stored content is received, the location application 616 compares metadata in the request to metadata stored in the metadata/location database 608 to identify a URL or other reference data indicating the location of the specific content. The location application 616 is also configured to update the location database 608 with e.g., reserved URL prior to actual recording of content and/or with actual URL at the time of recording. Moreover, the locator application 616 may be utilized to determine, prior to instantiating a recording by the scheduler application 612, whether the requested content has already been recorded or is already scheduled to be recorded.

As noted above, the recording manager 223 of FIG. 6 may take any number of physical forms, comprising for example software running on one of a plurality of discrete modules or cards within a larger network headend or edge device of the type well known in the art. The server may also comprise firmware, either alone or in combination with other hardware/software components such as those previously described (e.g., disposed in the aforementioned edge device). Alternatively, the recording manager 223 may be a stand-alone device disposed at the headend or other location (such as a VOD server 105 or application server 104), and may even include its own RF front end (e.g., modulators, encryptors, etc.) or optical interface so as to interface directly with various portions of the HFC network 101 if desired. Numerous other configurations may be used with any configuration or combination of hardware, firmware, or software, and may be disposed within one or any number of different physical or logical entities.

CPE—

Figure 7:
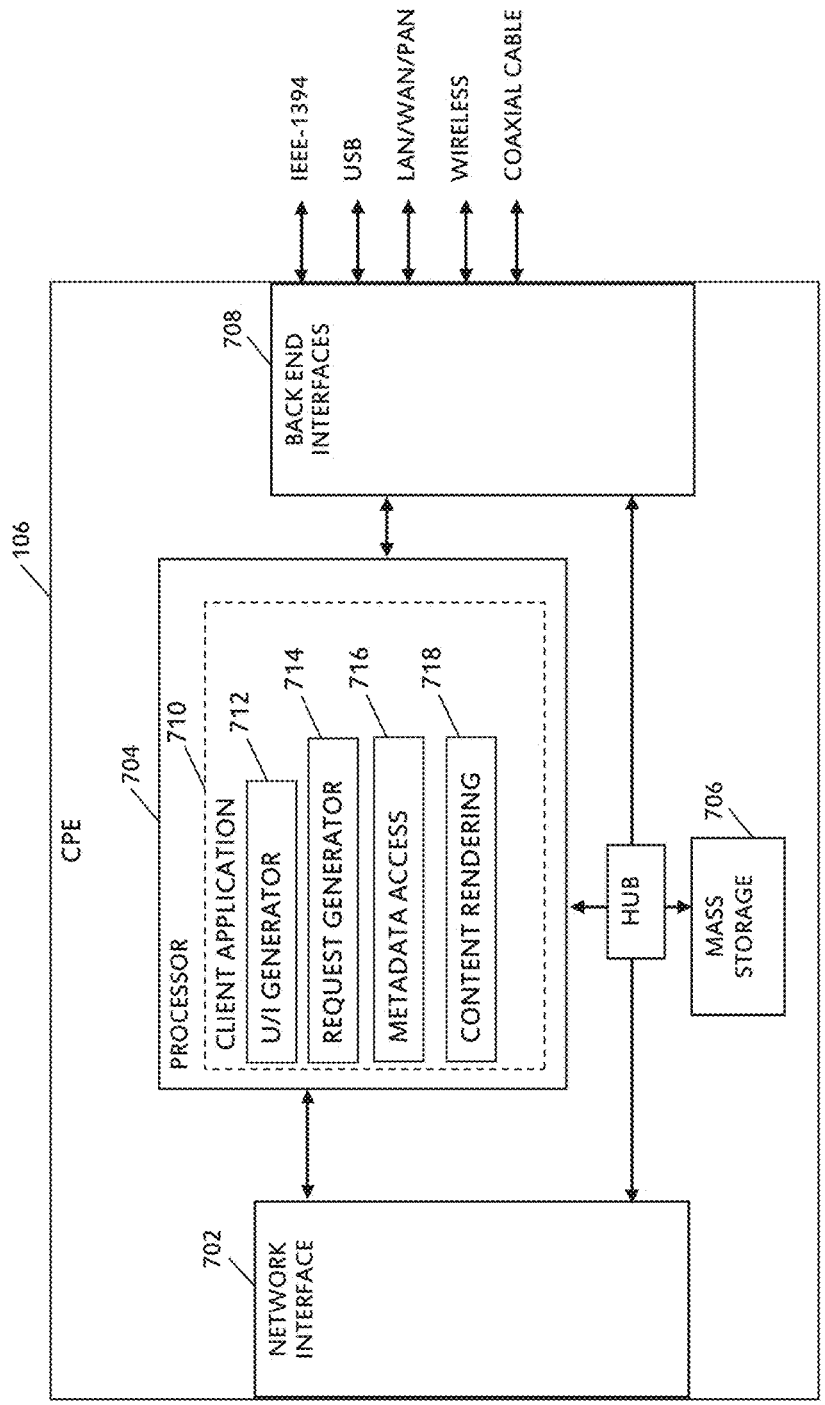
FIG. 7 is a functional block diagram of one exemplary embodiment of a CPE for use in accordance with the present disclosure.

FIG. 7 illustrates an exemplary embodiment of a consumer premises equipment (CPE) 106 with content recording and access capability as discussed herein.

As shown in FIG. 7, the CPE 106 generally comprises front end network interfaces 702 (including demodulator/decryptors) configured to receive packetized content from e.g., an internet 111 and/or the HFC network 101, digital processor(s) 704, mass storage device 706, and a plurality of "back end" interfaces 708 (e.g., video/audio interfaces, IEEE-1394 "FireWire", USB, serial/parallel ports, Thunder-Bolt, Ethernet, MoCA, etc.) for interface with other end-user apparatus such as televisions, personal electronics, computers, Wi-Fi or other network hubs/routers, etc. Although various protocols and interfaces are illustrated in FIG. 7, it is appreciated that the CPE of the present disclosure may be configured to communicate using any current and future wireline and wireless interfaces and protocols. Other components which may be utilized within the device (deleted from FIG. 7 for simplicity) various processing layers (e.g., DOCSIS MAC or DAVIC OOB channel, MPEG, etc.) as well as media processors and other specialized SoC or ASIC devices.

The exemplary CPE 106 of FIG. 7 is also provided with various client applications 710 including e.g., a U/I generator 712, a request generator 714, metadata access 716, and content rendering applications 718. The application for rendering content 718 is configured in one variant to identify and receive content for display at a display device 212. In one embodiment, a separate (dedicated) client application adapted for content selection, browsing, and download may be used (e.g., request generator application 714). This may include, e.g., a separate GUI or other type of UI, or a separate application e.g., U/I generator application 712 may be utilized for generating the user interface. Alternatively, the selection, download, and upload functionality described herein may be integrated into one or more existing or downloadable applications (such as a VOD application, "Watch TV" application, navigator, TV-commerce application, or EPG). The application (and session or other) layer protocols necessary to control the content selection, download, and upload functionality may even be disposed on another device (e.g., PDA or cellular smartphone) as previously described in order to instigate the browsing, selection, purchase, and download/streaming of content.

In another embodiment, the client applications 710 function in response to signals or communications provided by a device in communication with the CPE 106. For example, the CPE may comprise a wireless interface (e.g., 802.11 a/b/g/n, Bluetooth, cellular, 802.15 PAN, 802.16 WiMAX, 802.20, etc.) such that it can service content selection, payment, and download/streaming requests from e.g., mobile devices 216a in communication therewith. In one such variant, the mobile device 216a comprises a tablet, laptop computer, smartphone, PDA, gaming console, or similar handheld device that has an application (such as e.g., a distributed portion of client/server application) running thereon. The mobile device application may be stand-alone, distributed or shared across the mobile device 216a and CPE 106, or integrated with another application at the mobile device 216a. Hence, users operating the client application on the tablet/smartphone/PDA (mobile device 216a) will utilize their wireless interface to the CPE 106 in order to remotely instigate a content streaming from the network, the latter in effect acting as a gateway to the content distribution network. The wireless forward channel(s) of the interface (e.g., CPE to mobile device 800) can be used to transmit the content after processing (e.g., decoding) by the CPE 106, or stream the "raw" unprocessed content (or even the received and demultiplexed MPEG encoded packets) to the mobile device 800 and/or a storage device such as the premises DVR 240.

As discussed above, in one instance the recording manager 223 may be tasked to cause the either the network storage apparatus or the premises DVR 240 to record content at a given date/time. This latter approach may be accomplished by the recording manager 223 at the given date/time causing the CPE to "wake up" (via a command sent thereto), stream the particular content, and have the content passed by the CPE to the local DVR 240 for recording thereat.

In the exemplary implementation, metadata access (via the metadata access application 616) is necessary to generate the user interface, generate requests, enable authentication/ entitlements checks, stream content, and identify content in storage, as discussed elsewhere herein.

Mobile Device—

Figure 8:
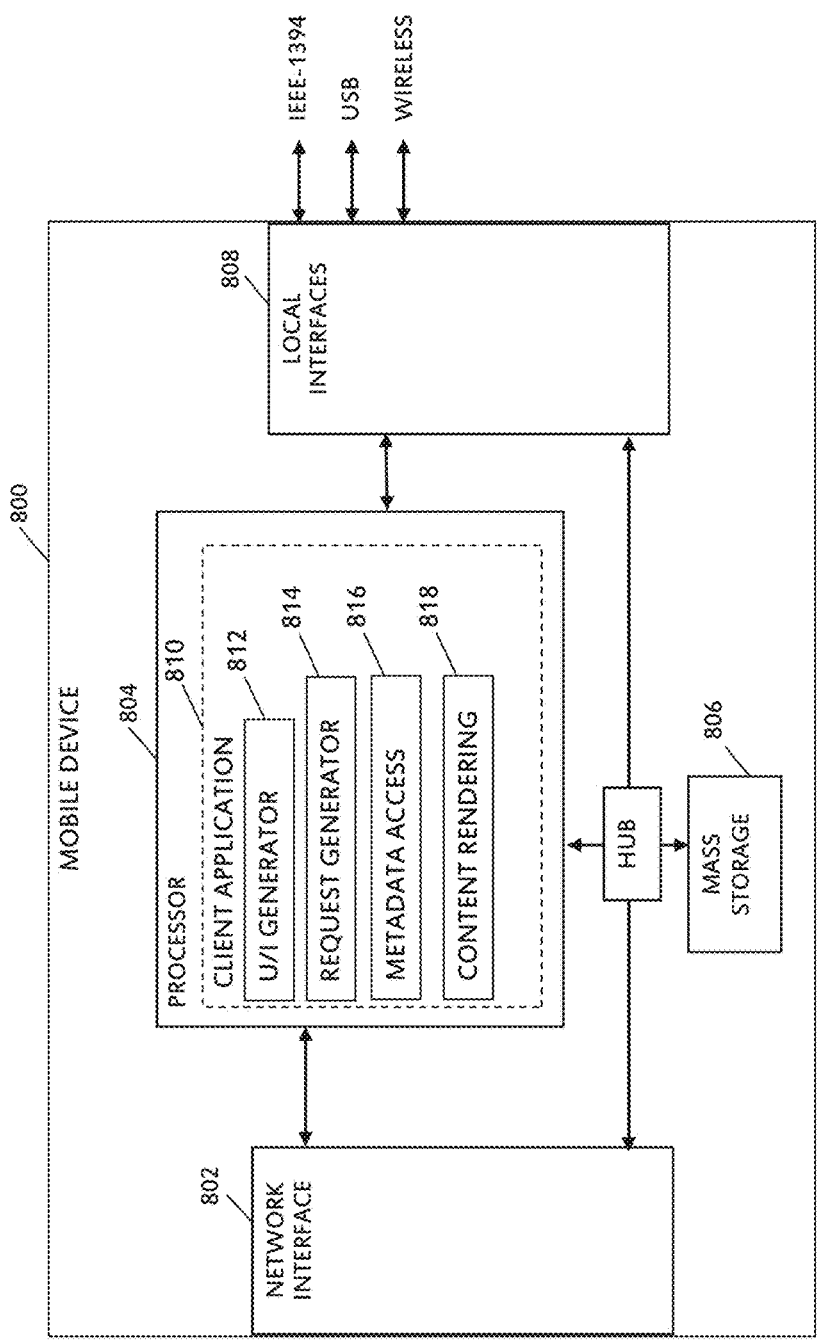
FIG. 8 is a functional block diagram of one exemplary embodiment of mobile client device for use in accordance with the present disclosure.

FIG. 8 illustrates an exemplary embodiment of a mobile apparatus 800 with content recording and access capability as discussed herein. As discussed elsewhere herein, the mobile device 800 may comprise e.g., a smart phone, laptop computer, tablet, PDA, gaming console, or similar handheld device.

As shown in FIG. 8, the mobile device 800 generally comprises a network interface 802 (including for example demodulator/decryptors) for interface with an internet 111 or other network serving the user's location, digital processor (s) 804, mass storage device 806, and a plurality of interfaces 808 (e.g., video/audio interfaces, wired such as IEEE-1394 "FireWire", USB, wireless, etc.) for interface with other end-user apparatus such as televisions, personal electronics, computers, Wi-Fi APs, etc. Although various interfaces and protocols are illustrated in FIG. 8, it is appreciated that the mobile device 800 of the present disclosure may be configured to communicate over any current and future wired and/or wireless interfaces and protocols. Other components which may be utilized within the device have deleted from FIG. 8 for simplicity.

The mobile device processor 804 is configured to run various client applications 810 thereon. In one embodiment, a content rendering application 818 is provided to access and stream content to a display apparatus associated with the mobile device 800. In one embodiment, a separate (dedicated) client application adapted for content selection, browsing, download, and upload may be used (e.g., request generator application 814). Another separate application program may but utilized to generate a GUI or other type of UI (e.g., U/I generator application 814). Alternatively, the selection, download, and upload functionality described herein may be integrated into one or more existing or downloadable applications (such as a VOD application, "Watch TV" application, navigator, TV-commerce application, or EPG).

In the event the mobile device 800 utilizes the recording manager 400 to cause recording of content at the cloud storage 208, the request generator application 814 and metadata access application 816 cooperate to request access to the recorded content from the recording manager 400. The recording itself is facilitated by the recording manager 400 and other managed network entities configured to stream packetized content or otherwise receive the content from a content source.

Client-Side Implementations—

It is noted that while the foregoing exemplary embodiments of the various methods and apparatus of the disclosure are cast primarily in the context of network-based processes and content storage, the present disclosure envisions embodiments which are at least partly (or even wholly) implemented at other network locations, including even the user's premises. For instance, in one such variant, the user's local recording equipment (e.g., DVR) and client device are configured to selectively contact various network-side entities (such as the recording manager 600 of FIG. 6) to implement the functions described herein, including calls to advertising decision processes at time of local (premises) recording, so as to generate a manifest or other data structure which may be used later by the client device(s) to obtain state-preserved advertisements for use with playback by the client.

For instance, in one such implementation, a user's Wi-Fi-enabled IP mobile device with content rendering capability (e.g., media player application program) may be used to access locally recorded (e.g., premises DVR-based) linear or VOD content at a later time. The rendering application program may, upon encountering secondary content cues detected within the recorded content on decode/rendering, make calls to URLs listed in a manifest file maintained by the client device (or even via access of a network-side based manifest), such that the secondary content at the called URL can be streamed and inserted into the primary content, or rendered alongside the primary content (such as in a separate window). This approach enables reduction of DVR or other local asset storage requirements, since the secondary content is not stored "in line" with the primary linear or VOD content on the local asset. See, e.g., the methods and apparatus of co-owned and co-pending U.S. patent application Ser. No. 15/347,665 entitled "APPARATUS AND METHODS FOR SELECTIVE SECONDARY CONTENT INSERTION IN A DIGITAL NETWORK" filed Nov. 9, 2016, Ser. No. 14/686,584 entitled "APPARATUS AND METHODS FOR THUMBNAIL GENERATION" filed Apr. 14, 2015, and Ser. No. 14/220,021 entitled "APPARATUS AND METHODS FOR RECORDING A MEDIA STREAM", filed on Mar. 19, 2014, each of the foregoing which is incorporated herein by reference in its entirety.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

It will also be appreciated that while certain steps and aspects of the various methods and apparatus described herein may be performed by a human being, the disclosed computer technology improvements are computer-implemented, and computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of delivering digitally rendered programming content in a content distribution network, the computerized method comprising:
    receiving data representative of a request for storing the digitally rendered programming content, the request (i) associated with a computerized client device or user associated with a subscriber account and (ii) being received through the content distribution network;
    storing the requested digitally rendered programming content;
    storing data indicating at least a time the storing of the digitally rendered programming content is effected;
    identifying one or more secondary digitally rendered content elements associated with the requested digitally rendered programming content at the time the storing is effected, the identifying of the one or more secondary digitally rendered content elements associated with the requested digitally rendered programming content at a time the storing is effected comprising: (i) contacting a secondary content decision process using at least data indicative of the computerized client device or the user; and (ii) receiving from the secondary content decision process first data indicative of the one or more secondary digitally rendered content elements to be inserted into the stored digitally rendered programming content;
    receiving data representative of a request for at least a portion of the stored digitally rendered programming content from at least the computerized client device;
    determining that the request meets one or more prescribed criteria, the one or more prescribed criteria comprising a time associated with receipt of the request being within a prescribed temporal window of the time of the storing of the digitally rendered programming content; and
    based on the determination that the request meets the one or more prescribed criteria, causing delivery of the identified one or more secondary digitally rendered content elements to at least the computerized client device, the causing delivery of the identified one or more secondary digitally rendered content elements to at least the computerized client device comprising causing delivery according to respective cues within the stored digitally rendered programming content while the stored digitally rendered programming content is being delivered to at least the computerized client device.

2. The computerized method of claim 1, wherein the stored digitally rendered programming content comprises linear content, and the cues comprise Society of Cable Telecommunications Engineers (SCTE)-35 cues.

3. The computerized method of claim 1, wherein at least a portion of the stored digitally rendered programming content is stored on a network-based storage device and within a storage area designated for use by the user only.

4. The computerized method of claim 1, wherein the storing comprises storing a first portion of the digitally rendered programming content in a user-specific storage area, and a second portion of the digitally rendered programming content in a common storage area.

5. The computerized method of claim 4, wherein the storing the first portion of the digitally rendered programming content in a user-specific storage area comprises:
    applying at least one algorithm to the digitally rendered programming content to identify a plurality of data structures within the digitally rendered programming content, a combination of the identified plurality of data structures being unique to the requesting user;
    extracting or copying the identified data structures to the user-specific storage area; and
    storing data indicative of the identified plurality of data structures so as to enable recombination with the second portion.

6. The computerized method of claim 4, wherein the first portion comprises only a particular type of data structure within the requested digitally rendered programming content.

7. The computerized method of claim 6, wherein the particular type of data structure within the requested digitally rendered programming content comprises one of a P-frame, P-slice, I-frame, or I-slice.

8. Computerized network apparatus configured for secondary content management within a content distribution network, the computerized network apparatus comprising:
   digital processor apparatus;
   first network data interface apparatus in data communication with the digital processor apparatus and configured to communicate with one or more network entities configured to select appropriate digitally rendered secondary content for respective ones of a plurality of computerized user devices;
   second network data interface apparatus in data communication with the digital processor apparatus and configured to communicate with a network content storage apparatus;
   third network data interface apparatus in data communication with the digital processor apparatus and configured to communicate with the plurality of computerized user devices via at least one or more communication channels of the content distribution network; and
   storage apparatus in data communication with the digital processor apparatus, the storage apparatus comprising at least one computer program configured to, when executed on the digital processor apparatus:
      receive from one of the plurality of computerized user devices via the third interface, a data message comprising a request to record digitally rendered programming content, the request being received through the content distribution network;
      store the requested digitally rendered programming content, the storage comprising storage of a first portion of the digitally rendered programming content in a user-specific data storage area, and a second portion of the digitally rendered programming content in a common data storage area;
      communicate with one or more computerized network entities via the first network data interface to identify the appropriate digitally rendered secondary content for the one of the plurality of computerized user devices, the appropriate digitally rendered secondary content associated with the requested digitally rendered programming content at a time that the storage of the requested digitally rendered programming content is effected;
      receive data representative of a request for at least a portion of the stored digitally rendered programming content from at least the one of the plurality of computerized user devices;
      determine, using a computerized process, that the request meets one or more prescribed criteria; and
      based on the determination that the request meets the one or more prescribed criteria, cause delivery of the identified appropriate digitally rendered secondary content to at least the one of the plurality of computerized user devices.

9. The computerized network apparatus of claim 8, wherein the storage of the first portion of the digitally rendered programming content in a user-specific data storage area comprises:
   application of at least one algorithm to the digitally rendered programming content to identify a plurality of data structures within the digitally rendered programming content, a combination of the identified plurality of data structures being unique to a user of the one of the plurality of computerized user receiver devices;
   extract or copy the identified data structures to the user-specific data storage area; and
   store data indicative of the identified plurality of data structures so as to enable recombination thereof with the second portion.

10. The computerized network apparatus of claim 9, wherein the first portion comprises only a particular type of data structure within the requested digitally rendered programming content.

11. The computerized network apparatus of claim 10, wherein the particular type of data structure within the requested digitally rendered programming content is selected from the group consisting of: (i) a P-frame, (ii) a P-slice, (iii) an I-frame, and (iv) an I-slice.

12. The computerized network apparatus of claim 8, wherein the determination that the request meets one or more prescribed criteria comprises a determination, using the computerized process, that the request is received within a prescribed time period from a time that the storage is effected.

13. The computerized network apparatus of claim 8, wherein the delivery of the identified appropriate digitally rendered secondary content to at least the one of the plurality of computerized user devices comprises delivery of the identified appropriate digitally rendered secondary content to at least the one of the plurality of computerized user devices at one or more insertion points specified by marker data within the digitally rendered programming content.

14. The computerized network apparatus of claim 8, wherein the delivery of the identified appropriate digitally rendered secondary content to at least the one of the plurality of computerized user devices comprises assembly of the identified appropriate digitally rendered secondary content, and at least sub-portions of the first and second portions from the user-specific data storage area and the common data storage area, respectively, into a digital content stream.

15. The computerized network apparatus of claim 8, wherein the storage of the first portion of the digitally rendered programming content in the user-specific data storage area, and the second portion of the digitally rendered programming content in the common data storage area comprises allocation of a plurality of segments associated with the digitally rendered programming content between the user-specific data storage area and the common data storage area based at least on an allocation algorithm.

16. The computerized network apparatus of claim 15, wherein the allocation algorithm identifies a plurality of numeric sequences or their mathematical complements, and the allocation of the plurality of segments comprises allocating the plurality of segments corresponding to one of the plurality of numeric sequences or its mathematical complement.

17. Computer readable apparatus comprising a non-transitory storage medium, the non-transitory medium comprising at least one computer program having a plurality of instructions, the instructions configured to, when executed on a digital processing apparatus of a computerized server apparatus within a content distribution network:
   receive, from a computerized client device associated with a user, data representative of a request to store digitally rendered programming content, the request received through the content distribution network, the user being associated with an account via data maintained in a subscriber database associated with the content distribution network;

store the requested digitally rendered programming content;

store first data indicative of at least a time that the storage of the digitally rendered programming content is effected;

contact a computerized secondary content decision process, the contact including at least data indicative of the computerized client device or the user;

receive, from the computerized secondary content decision process, second data indicative of one or more digitally rendered secondary content elements to be inserted into the stored digitally rendered programming content, the one or more digitally rendered secondary content elements selected based at least on data indicating an association between the one or more digitally rendered secondary content elements with the requested digitally rendered programming content at the time that the storage of the digitally rendered programming content is effected;

receive data representative of a request for at least a portion of the stored digitally rendered programming content from the computerized client device;

determine that the data representative of the request is received within a prescribed time period from the time that the storage is effected; and based at least one on the determination, cause delivery of the one or more digitally rendered secondary content elements to the computerized client device, the delivery being in accordance with respective cues contained within the stored digitally rendered programming content while the stored digitally rendered programming content is being delivered to the computerized client device.

18. The computer readable apparatus of claim 17, wherein the stored digitally rendered programming content comprises linear content, and the cues comprise Society of Cable Telecommunications Engineers (SCTE)-35 cues.

19. The computer readable apparatus of claim 17, wherein at least a portion of the stored digitally rendered programming content is stored on a network-based storage device and within a storage area designated for access only by of (i) the user, and/or (ii) the computerized client device.

20. The computer readable apparatus of claim 17, wherein the one or more digitally rendered secondary content elements are identified by the computerized secondary content decision process based at least on (i) the data indicative of the computerized client device or the user, and (ii) a subject matter or theme associated with the digitally rendered programming content.

* * * * *